US012614283B2

(12) United States Patent
Liu et al.

(10) Patent No.: US 12,614,283 B2
(45) Date of Patent: Apr. 28, 2026

(54) SYSTEMS AND METHODS FOR IMAGE SEGMENTATION

(71) Applicant: SHANGHAI UNITED IMAGING HEALTHCARE CO., LTD., Shanghai (CN)

(72) Inventors: Chaoran Liu, Shanghai (CN); Yang Li, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 376 days.

(21) Appl. No.: 18/191,856

(22) Filed: Mar. 28, 2023

(65) Prior Publication Data

US 2023/0237665 A1    Jul. 27, 2023

Related U.S. Application Data

(63) Continuation of application No. PCT/CN2021/104787, filed on Jul. 6, 2021.

(30) Foreign Application Priority Data

Sep. 28, 2020    (CN) .......................... 202011041387.7

(51) Int. Cl.
*G06K 9/00*         (2022.01)
*G06T 7/00*         (2017.01)
(Continued)

(52) U.S. Cl.
CPC .............. *G06T 7/11* (2017.01); *G06T 7/0012* (2013.01); *G06T 7/33* (2017.01); *G06V 10/26* (2022.01);
(Continued)

(58) Field of Classification Search
CPC . G06T 7/11; G06T 7/0012; G06T 7/33; G06T 2207/10081; G06T 2207/10088;
(Continued)

(56) References Cited

U.S. PATENT DOCUMENTS 9,208,572 B2 * 12/2015 Liu .......................... G06T 7/149
10,878,576 B2 * 12/2020 Han .......................... G06T 7/11
(Continued)

FOREIGN PATENT DOCUMENTS

CN        104050666 A      9/2014
CN        107093190 A      8/2017
(Continued)

OTHER PUBLICATIONS

Automated quality control in image segmentation: application to the UK Biobank cardiovascular magnetic resonance imaging study, Robert Robinson et al., JOCMR, 2019, pp. 1-14 (Year: 2019).*
(Continued)

*Primary Examiner* — Jayesh A Patel
(74) *Attorney, Agent, or Firm* — METIS IP LLC

(57)         ABSTRACT

Systems and methods for image segmentation are provided. The systems may obtain a target image and a template image relating to the target image. The template image may correspond to an initial mask reflecting initial segmentations of the template image. The systems may determine a first transformation and an intermediate template image by preliminarily registering the template image to the target image and generate an intermediate mask based on the initial mask and the first transformation. The systems may determine, based on the intermediate mask, one or more first regions from the target image and one or more second regions from the intermediate template image. The systems may determine a second transformation by registering each of the one or more second regions to a corresponding first region. The (Continued)

systems may determine a target mask according to which the target image can be segmented based on one or more second transformations.

19 Claims, 11 Drawing Sheets

(51) Int. Cl.
| | | |
|---|---|---|
| *G06T 7/11* | (2017.01) | |
| *G06T 7/33* | (2017.01) | |
| *G06V 10/26* | (2022.01) | |

(52) U.S. Cl.
CPC .............. *G06T 2207/10081* (2013.01); *G06T 2207/10088* (2013.01); *G06V 2201/031* (2022.01)

(58) Field of Classification Search
CPC ......... G06T 7/0014; G06T 2207/10104; G06T 2207/30016; G06T 7/30; G06V 10/26; G06V 2201/031
See application file for complete search history.

(56) References Cited

U.S. PATENT DOCUMENTS

| | | | | |
|---|---|---|---|---|
| 10,937,172 | B2 * | 3/2021 | Kakrania | ................ G06T 7/149 |
| 11,461,898 | B2 * | 10/2022 | Ross | ....................... A61B 3/102 |
| 2005/0232514 | A1 * | 10/2005 | Chen | ....................... G06T 7/215 |
| | | | | 382/302 |
| 2006/0021027 | A1 * | 1/2006 | Saito | .................. H04N 1/00347 |
| | | | | 726/18 |
| 2014/0153797 | A1 * | 6/2014 | Wan | .......................... G06T 7/38 |
| | | | | 382/128 |
| 2014/0226889 | A1 * | 8/2014 | Liu | ......................... G06T 7/174 |
| | | | | 382/131 |
| 2015/0293196 | A1 * | 10/2015 | Maréchal | ............. G01R 33/543 |
| | | | | 324/309 |
| 2018/0360407 | A1 * | 12/2018 | Florent | ................ A61B 6/5217 |
| 2020/0311943 | A1 * | 10/2020 | Dai | ....................... G06N 3/0464 |
| 2021/0035297 | A1 * | 2/2021 | Barbash | ................... G06T 7/337 |
| 2021/0035299 | A1 * | 2/2021 | Ikegami | ................. H01J 49/004 |
| 2022/0036525 | A1 * | 2/2022 | Xin | ....................... G06V 10/772 |

FOREIGN PATENT DOCUMENTS

| | | | | |
|---|---|---|---|---|
| CN | 109325971 | A | 2/2019 | |
| CN | 109741378 | A | 5/2019 | |
| CN | 110599526 | A | 12/2019 | |
| WO | WO-2011109710 | A1 * | 9/2011 ............... G06T 7/30 |
| WO | 2022062566 | A1 | 3/2022 | |

OTHER PUBLICATIONS

Construction of a Brain Template from MR Images Using State-of-the-Art Registration and Segmentation Techniques, Dieter Seghers, et al., Springer, 2004, pp. 696-703 (Year: 2004).*

Liu, Hong et al., Segmentation of Specific Tissue in Brain MR Images Based on Weighted Similarity Measurement, Chinese Journal of Computers, 37(6): 1241-1250, 2014.

Xabier Artaechevarria et al., Combination Strategies in Multi-Atlas Image Segmentation: Application to Brain MR Data, IEEE Transactions on Medical Imaging, 28(8): 1266-1277, 2009.

International Search Report in PCT/CN2021/104787 mailed on Oct. 9, 2021, 4 pages.

Written Opinion in PCT/CN2021/104787 mailed on Oct. 9, 2021, 7 pages.

First Office Action in Chinese Application No. 202011041387.7 mailed on Aug. 1, 2022, 12 pages.

* cited by examiner

100

300

<u>500</u>

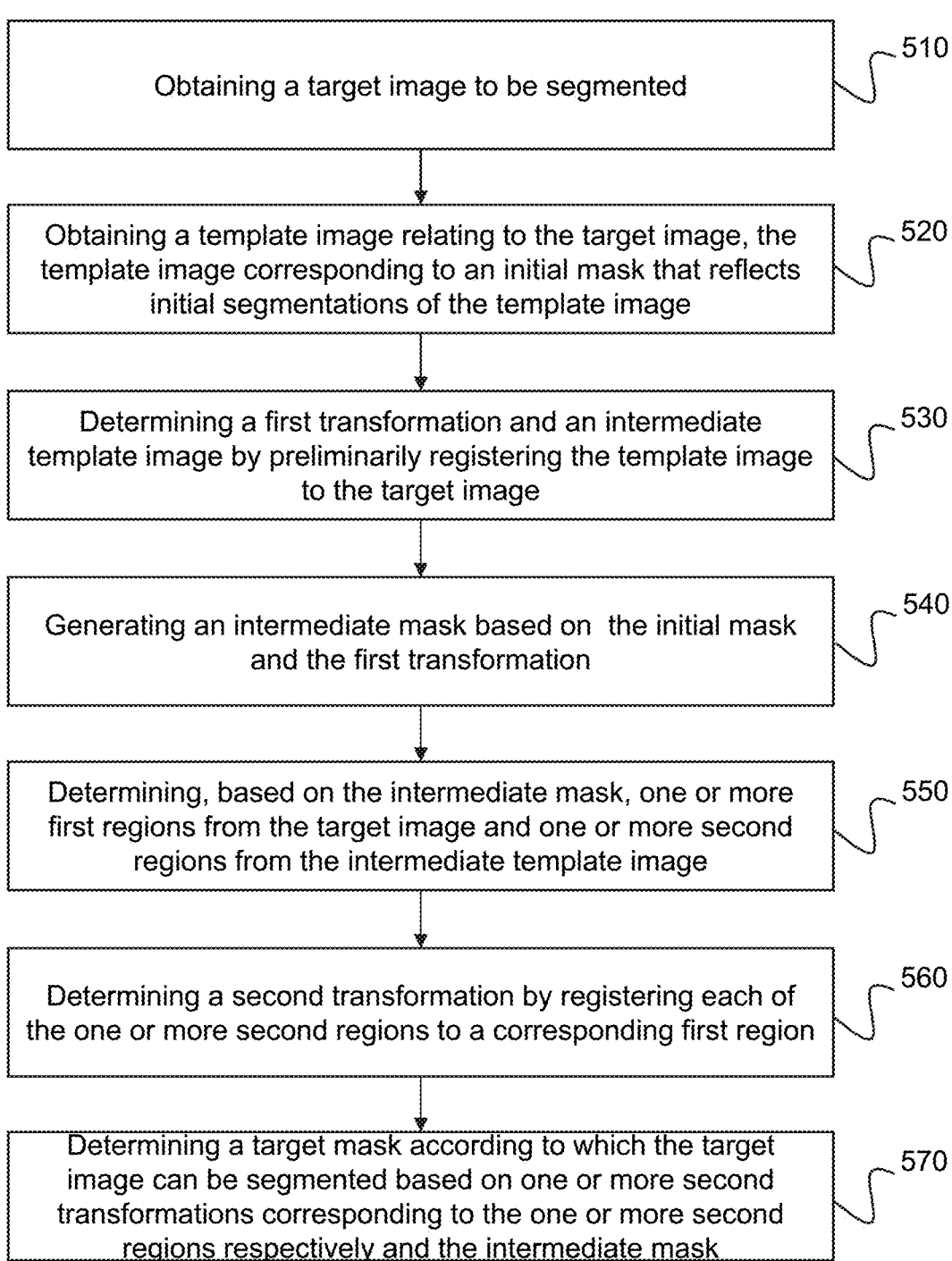

Obtaining a target image to be segmented ⟶ 510

Obtaining a template image relating to the target image, the template image corresponding to an initial mask that reflects initial segmentations of the template image ⟶ 520

Determining a first transformation and an intermediate template image by preliminarily registering the template image to the target image ⟶ 530

Generating an intermediate mask based on the initial mask and the first transformation ⟶ 540

Determining, based on the intermediate mask, one or more first regions from the target image and one or more second regions from the intermediate template image ⟶ 550

Determining a second transformation by registering each of the one or more second regions to a corresponding first region ⟶ 560

Determining a target mask according to which the target image can be segmented based on one or more second transformations corresponding to the one or more second regions respectively and the intermediate mask ⟶ 570

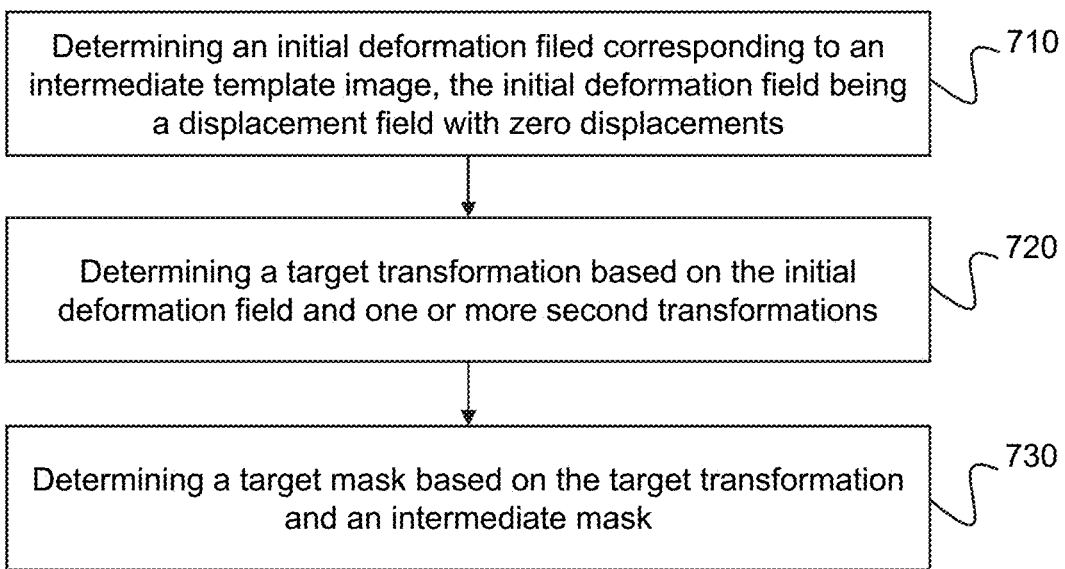

Determining an initial deformation filed corresponding to an intermediate template image, the initial deformation field being a displacement field with zero displacements ⟶ 710

Determining a target transformation based on the initial deformation field and one or more second transformations ⟶ 720

Determining a target mask based on the target transformation and an intermediate mask ⟶ 730

FIG. 7

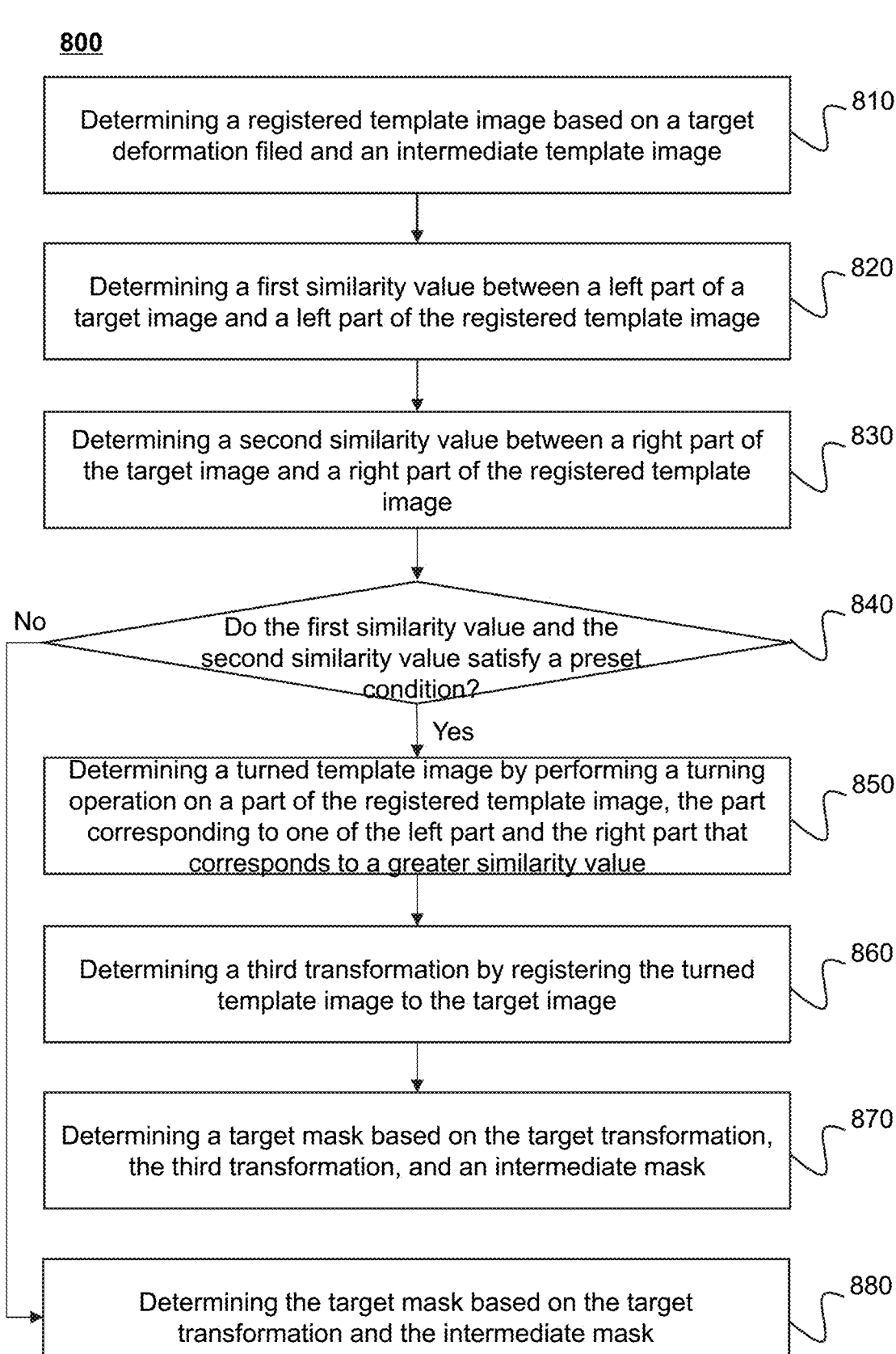

<u>800</u>

Determining a registered template image based on a target deformation filed and an intermediate template image ⟋810

Determining a first similarity value between a left part of a target image and a left part of the registered template image ⟋820

Determining a second similarity value between a right part of the target image and a right part of the registered template image ⟋830

Do the first similarity value and the second similarity value satisfy a preset condition? ⟋840

No

Yes

Determining a turned template image by performing a turning operation on a part of the registered template image, the part corresponding to one of the left part and the right part that corresponds to a greater similarity value ⟋850

Determining a third transformation by registering the turned template image to the target image ⟋860

Determining a target mask based on the target transformation, the third transformation, and an intermediate mask ⟋870

Determining the target mask based on the target transformation and the intermediate mask ⟋880

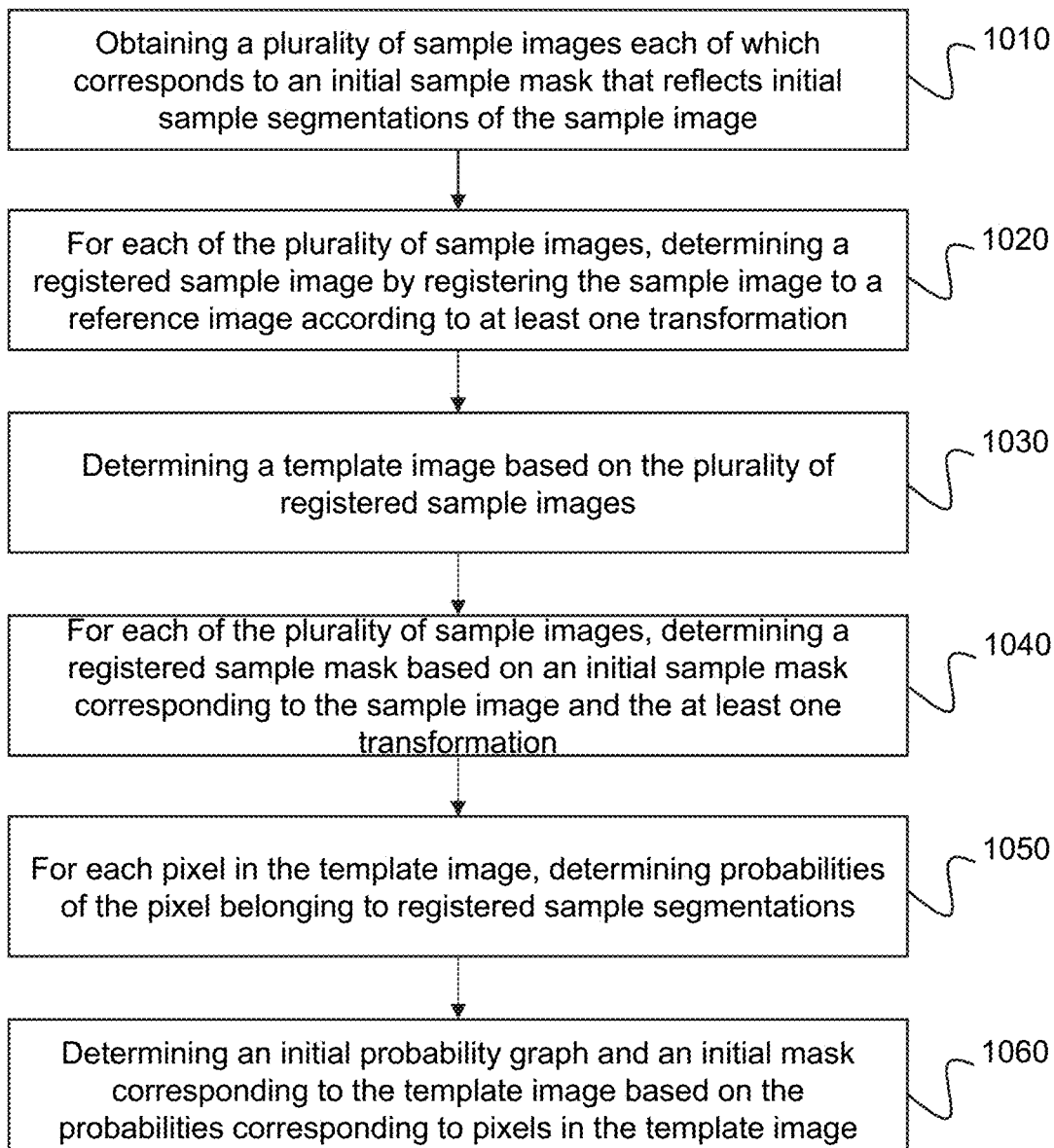

Obtaining a plurality of sample images each of which corresponds to an initial sample mask that reflects initial sample segmentations of the sample image    1010

For each of the plurality of sample images, determining a registered sample image by registering the sample image to a reference image according to at least one transformation    1020

Determining a template image based on the plurality of registered sample images    1030

For each of the plurality of sample images, determining a registered sample mask based on an initial sample mask corresponding to the sample image and the at least one transformation    1040

For each pixel in the template image, determining probabilities of the pixel belonging to registered sample segmentations    1050

Determining an initial probability graph and an initial mask corresponding to the template image based on the probabilities corresponding to pixels in the template image    1060

FIG. 10

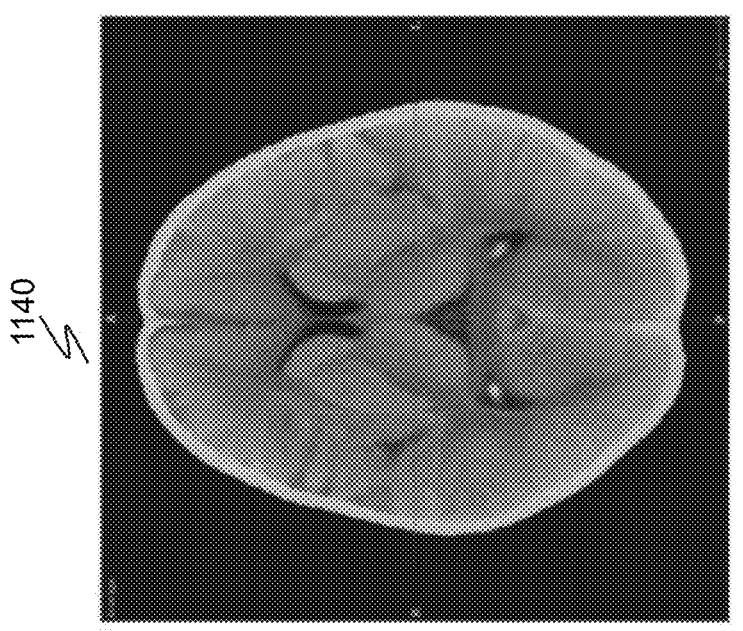
Template Image
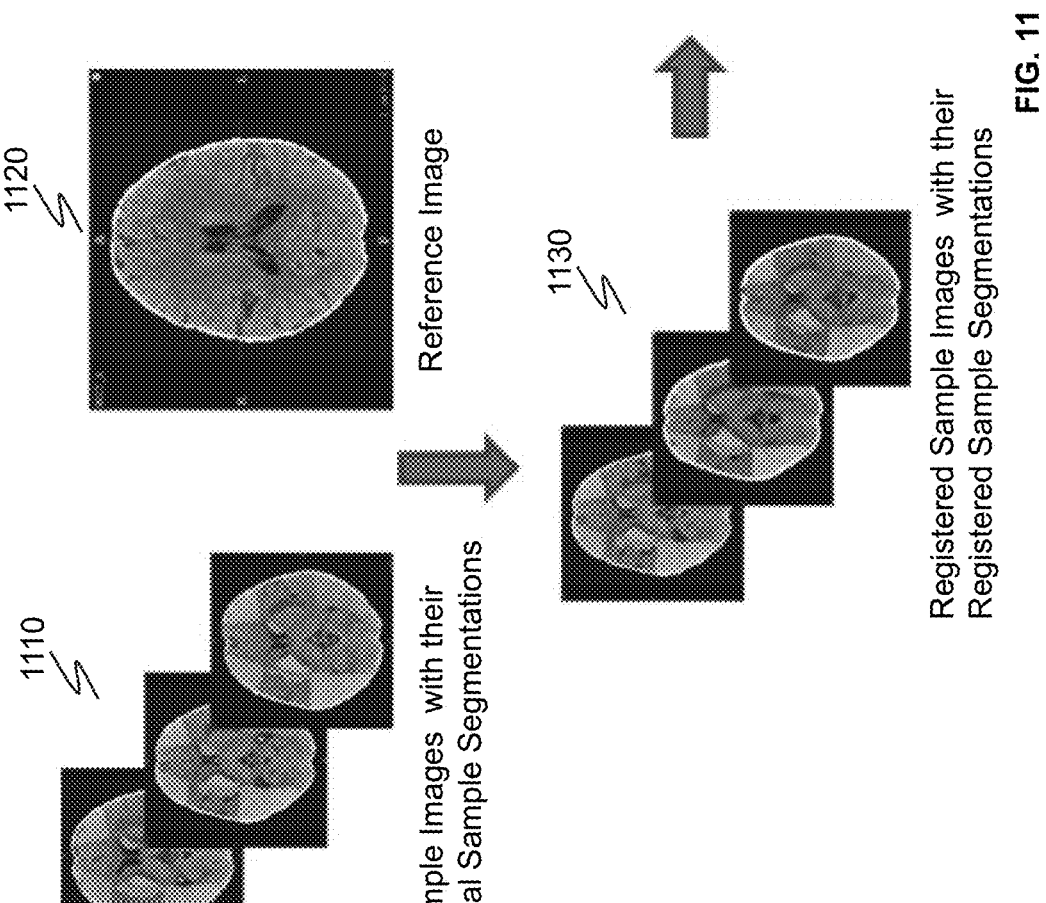
Reference Image
Sample Images with their
Initial Sample Segmentations
Registered Sample Images with their
Registered Sample Segmentations
FIG. 11

SYSTEMS AND METHODS FOR IMAGE SEGMENTATION

CROSS-REFERENCE TO RELATED APPLICATIONS

This application is a Continuation of International Application No. PCT/CN2021/104787, filed on Jul. 6, 2021, which claims priority to Chinese Patent Application No. 202011041387.7 filed on Sep. 28, 2020, the contents of which are hereby incorporated by reference in their entirety.

TECHNICAL FIELD

The present disclosure relates to the field of image processing, and in particular, to systems and methods for image segmentation.

BACKGROUND

With the development of medical imaging technologies, medical images obtained by medical imaging devices (e.g., a Computed Tomography (CT) device, a Magnetic Resonance Imaging (MRI) device, a Positron Emission Computed Tomography (PET) device) are widely used for disease diagnosis, surgical planning, prognosis evaluation, etc. For example, different portions of a medical image may reflect different diagnosis information. Accordingly, image segmentation (e.g., registration-based image segmentation) plays an important role in medical image processing. However, the different portions may correspond to different deformation levels or difference between the medical image and a registration template may be relatively large, which may result in that the medical image can't efficiently and accurately segmented. Therefore, it is desirable to provide systems and methods for efficient and accurate image segmentation.

SUMMARY

In an aspect of the present disclosure, a system for image segmentation is provided. The system may include a storage device storing a set of instructions and at least one processor in communication with the storage device. When executing the set of instructions, the at least one processor may be configured to direct the system to perform operations. The operations may include obtaining a target image to be segmented. The operations may include obtaining a template image relating to the target image. The template image may correspond to an initial mask that reflects initial segmentations of the template image. The operations may include determining a first transformation and an intermediate template image by preliminarily registering the template image to the target image. The operations may also include generating an intermediate mask based on the initial mask and the first transformation. The operations may include determining, based on the intermediate mask, one or more first regions from the target image and one or more second regions from the intermediate template image. The one or more second regions may correspond to the one or more first regions respectively. The operations may also include determining a second transformation by registering each of the one or more second regions to a corresponding first region. The operations may further include determining a target mask according to which the target image can be segmented based on one or more second transformations corresponding to the one or more second regions respectively and the intermediate mask.

In some embodiments, a similarity value between each of the one or more first regions and its corresponding second region may be less than a similarity threshold.

In some embodiments, the one or more second transformations may include one or more second deformation fields. The determining a target mask according to which the target image can be segmented based on one or more second transformations corresponding to the one or more second regions respectively and the intermediate mask may include determining an initial deformation field corresponding to the intermediate template image, the initial deformation field being a displacement field with zero displacement; determining a target transformation based on the initial deformation field and the one or more second deformation fields; and determining the target mask based on the target transformation and the intermediate mask.

In some embodiments, the determining a target transformation based on the initial deformation field and the one or more second deformation fields may include determining an intermediate deformation field by combining the initial deformation field and the one or more second deformation fields; and determining the target transformation by smoothing the intermediate deformation field.

In some embodiments, the determining the target mask based on the target transformation and the intermediate mask may include determining a registered template image based on the target transformation and the intermediate template image; determining a first similarity value between a left part of the target image and a left part of the registered template image; determining a second similarity value between a right part of the target image and a right part of the registered template image; determining whether the first similarity value and the second similarity value satisfy a preset condition; in response to determining that the first similarity value and the second similarity value satisfy the preset condition, determining a turned template image by performing a turning operation on a part of the registered template image, the part corresponding to one of the left part and the right part that corresponds to a greater similarity value; determining a third transformation by registering the turned template image to the target image; and determining the target mask based on the target transformation, the third transformation, and the intermediate mask.

In some embodiments, the target image may relate to a brain. The operations may further include determining, based on the target mask, target segmentations of the target image; and determining, based on the target segmentations of the target image, an evaluation score of the brain, the evaluation score reflecting an ischemic condition of the brain.

In some embodiments, the template image may correspond to an initial probability graph. For each pixel in the template image, the initial probability graph may reflect a probability of the pixel belonging to its corresponding initial segmentation.

In some embodiments, the determining, based on the target segmentations of the target image, an evaluation score of the brain may include determining a target probability graph based on the initial probability graph, the first transformation, and the one or more second transformations; and determining the evaluation score of the brain based on the target segmentations of the target image and the target probability graph.

In some embodiments, the obtaining a template image relating to the target image may include obtaining a plurality of sample images each of which corresponds to an initial sample mask that reflects initial sample segmentations of the sample image; for each of the plurality of sample images, determining a registered sample image by registering the sample image to a reference image according to at least one transformation; and determining the template image based on the plurality of registered sample images.

In some embodiments, the initial sample mask may be manually determined by an operator.

In some embodiments, the at least one transformation may include a transformation using a transformation matrix and a transformation using a deformation field.

In some embodiments, the determining the template image based on the plurality of registered sample images may include determining the template image by performing an averaging operation on the plurality of registered sample images.

In some embodiments, the operations may further include for each of the plurality of sample images, determining a registered sample mask based on the initial sample mask corresponding to the sample image and the at least one transformation, the registered sample mask reflecting registered sample segmentations corresponding to the initial sample segmentations; for each pixel in the template image, determining probabilities of the pixel belonging to the registered sample segmentations; and determining an initial probability graph and the initial mask corresponding to the template image based on the probabilities corresponding to pixels in the template image.

In another aspect of the present disclosure, a method for image segmentation is provided. The method may include obtaining a target image to be segmented. The method may include obtaining a template image relating to the target image. The template image may correspond to an initial mask that reflects initial segmentations of the template image. The method may include determining a first transformation and an intermediate template image by preliminarily registering the template image to the target image. The method may include generating an intermediate mask based on the initial mask and the first transformation. The method may include determining, based on the intermediate mask, one or more first regions from the target image and one or more second regions from the intermediate template image. The one or more second regions may correspond to the one or more first regions respectively. The method may also include determining a second transformation by registering each of the one or more second regions to a corresponding first region. The method may further include determining a target mask according to which the target image can be segmented based on one or more second transformations corresponding to the one or more second regions respectively and the intermediate mask.

In some embodiments, a similarity value between each of the one or more first regions and its corresponding second region may be less than a similarity threshold.

In some embodiments, the one or more second transformations may include one or more second deformation fields. The determining a target mask according to which the target image can be segmented based on one or more second transformations corresponding to the one or more second regions respectively and the intermediate mask may include determining an initial deformation field corresponding to the intermediate template image, the initial deformation field being a displacement field with zero displacement; determining a target transformation based on the initial deformation field and the one or more second deformation fields; and determining the target mask based on the target transformation and the intermediate mask.

In some embodiments, the determining a target transformation based on the initial deformation field and the one or more second deformation fields may include determining an intermediate deformation field by combining the initial deformation field and the one or more second deformation fields; and determining the target transformation by smoothing the intermediate deformation field.

In some embodiments, the determining the target mask based on the target transformation and the intermediate mask may include determining a registered template image based on the target transformation and the intermediate template image; determining a first similarity value between a left part of the target image and a left part of the registered template image; determining a second similarity value between a right part of the target image and a right part of the registered template image; determining whether the first similarity value and the second similarity value satisfy a preset condition; in response to determining that the first similarity value and the second similarity value satisfy the preset condition, determining a turned template image by performing a turning operation on a part of the registered template image, the part corresponding to one of the left part and the right part that corresponds to a greater similarity value; determining a third transformation by registering the turned template image to the target image; and determining the target mask based on the target transformation, the third transformation, and the intermediate mask.

In some embodiments, the target image may relate to a brain. The method may further include determining, based on the target mask, target segmentations of the target image; and determining, based on the target segmentations of the target image, an evaluation score of the brain, the evaluation score reflecting an ischemic condition of the brain.

In some embodiments, the template image may correspond to an initial probability graph. For each pixel in the template image, the initial probability graph may reflect a probability of the pixel belonging to its corresponding initial segmentation.

In some embodiments, the determining, based on the target segmentations of the target image, an evaluation score of the brain may include determining a target probability graph based on the initial probability graph, the first transformation, and the one or more second transformations; and determining the evaluation score of the brain based on the target segmentations of the target image and the target probability graph.

In some embodiments, the obtaining a template image relating to the target image may include obtaining a plurality of sample images each of which corresponds to an initial sample mask that reflects initial sample segmentations of the sample image; for each of the plurality of sample images, determining a registered sample image by registering the sample image to a reference image according to at least one transformation; and determining the template image based on the plurality of registered sample images.

In some embodiments, the initial sample mask may be manually determined by an operator.

In some embodiments, the at least one transformation may include a transformation using a transformation matrix and a transformation using a deformation field.

In some embodiments, the determining the template image based on the plurality of registered sample images may include determining the template image by performing an averaging operation on the plurality of registered sample images.

In some embodiments, the method may further include for each of the plurality of sample images, determining a registered sample mask based on the initial sample mask corresponding to the sample image and the at least one transformation, the registered sample mask reflecting registered sample segmentations corresponding to the initial sample segmentations; for each pixel in the template image, determining probabilities of the pixel belonging to the registered sample segmentations; and determining an initial probability graph and the initial mask corresponding to the template image based on the probabilities corresponding to pixels in the template image.

In another aspect of the present disclosure, a system for image segmentation is provided. The system may include an obtaining module, a global determination module, a region determination module, a local registration module, and a segmentation module. The obtaining module may be configured to obtain a target image to be segmented and obtain a template image relating to the target image. The template image may correspond to an initial mask that reflects initial segmentations of the template image. The global determination module may be configured to determine a first transformation and an intermediate template image by preliminarily registering the template image to the target image and generate an intermediate mask based on the initial mask and the first transformation. The region determination module may be configured to determine, based on the intermediate mask, one or more first regions from the target image and one or more second regions from the intermediate template image. The one or more second regions may correspond to the one or more first regions respectively. The local registration module may be configured to determine a second transformation by registering each of the one or more second regions to a corresponding first region. The segmentation module may be configured to determine a target mask according to which the target image can be segmented based on one or more second transformations corresponding to the one or more second regions respectively and the intermediate mask.

In another aspect of the present disclosure, a non-transitory computer readable medium is provided. The readable medium may include executable instructions that, when executed by at least one processor, direct the at least one processor to perform a method for image segmentation. The method may include obtaining a target image to be segmented. The method may include obtaining a template image relating to the target image. The template image may correspond to an initial mask that reflects initial segmentations of the template image. The method may include determining a first transformation and an intermediate template image by preliminarily registering the template image to the target image. The method may include generating an intermediate mask based on the initial mask and the first transformation. The method may include determining, based on the intermediate mask, one or more first regions from the target image and one or more second regions from the intermediate template image, the one or more second regions corresponding to the one or more first regions respectively. The method may also include determining a second transformation by registering each of the one or more second regions to a corresponding first region. The method may further include determining a target mask according to which the target image can be segmented based on one or more second transformations corresponding to the one or more second regions respectively and the intermediate mask.

In another aspect of the present disclosure, a system is provided. The system may include a storage device storing a set of instructions and at least one processor in communication with the storage device. When executing the set of instructions, the at least one processor may be configured to direct the system to perform operations. The operations may include obtaining a plurality of sample images each of which corresponds to an initial sample mask that reflects sample segmentations of the sample image. The operations may also include for each of the plurality of sample images, determining a registered sample image by registering the sample image to a reference image according to at least one transformation. The operations may further include determining the template image based on the plurality of registered sample images.

In another aspect of the present disclosure, a method is provided. The method may include obtaining a plurality of sample images each of which corresponds to an initial sample mask that reflects sample segmentations of the sample image. The method may also include for each of the plurality of sample images, determining a registered sample image by registering the sample image to a reference image according to at least one transformation. The method may further include determining the template image based on the plurality of registered sample images.

In another aspect of the present disclosure, a system is provided. The system may include an obtaining module, a registration module, and a determination module. The obtaining module may be configured to obtain a plurality of sample images each of which corresponds to an initial sample mask that reflects sample segmentations of the sample image. The registration module may be configured to for each of the plurality of sample images, determine a registered sample image by registering the sample image to a reference image according to at least one transformation. The determination module may be configured to determine the template image based on the plurality of registered sample images.

In another aspect of the present disclosure, a non-transitory computer readable medium is provided. The readable medium may include executable instructions that, when executed by at least one processor, direct the at least one processor to perform a method. The method may include obtaining a plurality of sample images each of which corresponds to an initial sample mask that reflects sample segmentations of the sample image. The method may also include for each of the plurality of sample images, determining a registered sample image by registering the sample image to a reference image according to at least one transformation. The method may further include determining the template image based on the plurality of registered sample images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in detail of exemplary embodiments. These exemplary embodiments are described in detail with reference to the drawings. These embodiments are not limiting, and in these embodiments, the same number indicates the same structure, wherein:

FIG. 5 is a flowchart illustrating an exemplary process for image segmentation according to some embodiments of the present disclosure;

FIG. 7 is a flowchart illustrating an exemplary process for determining a target mask according to some embodiments of the present disclosure;

FIG. 8 is a flowchart illustrating an exemplary process for determining a target mask according to some embodiments of the present disclosure;

FIG. 10 is a flowchart illustrating an exemplary process for determining a template image and its corresponding initial probability graph and initial mask according to some embodiments of the present disclosure; and FIG. 11 is a schematic diagram illustrating an exemplary process for determining a template image according to some embodiments of the present disclosure.

DETAILED DESCRIPTION

Figure 1:
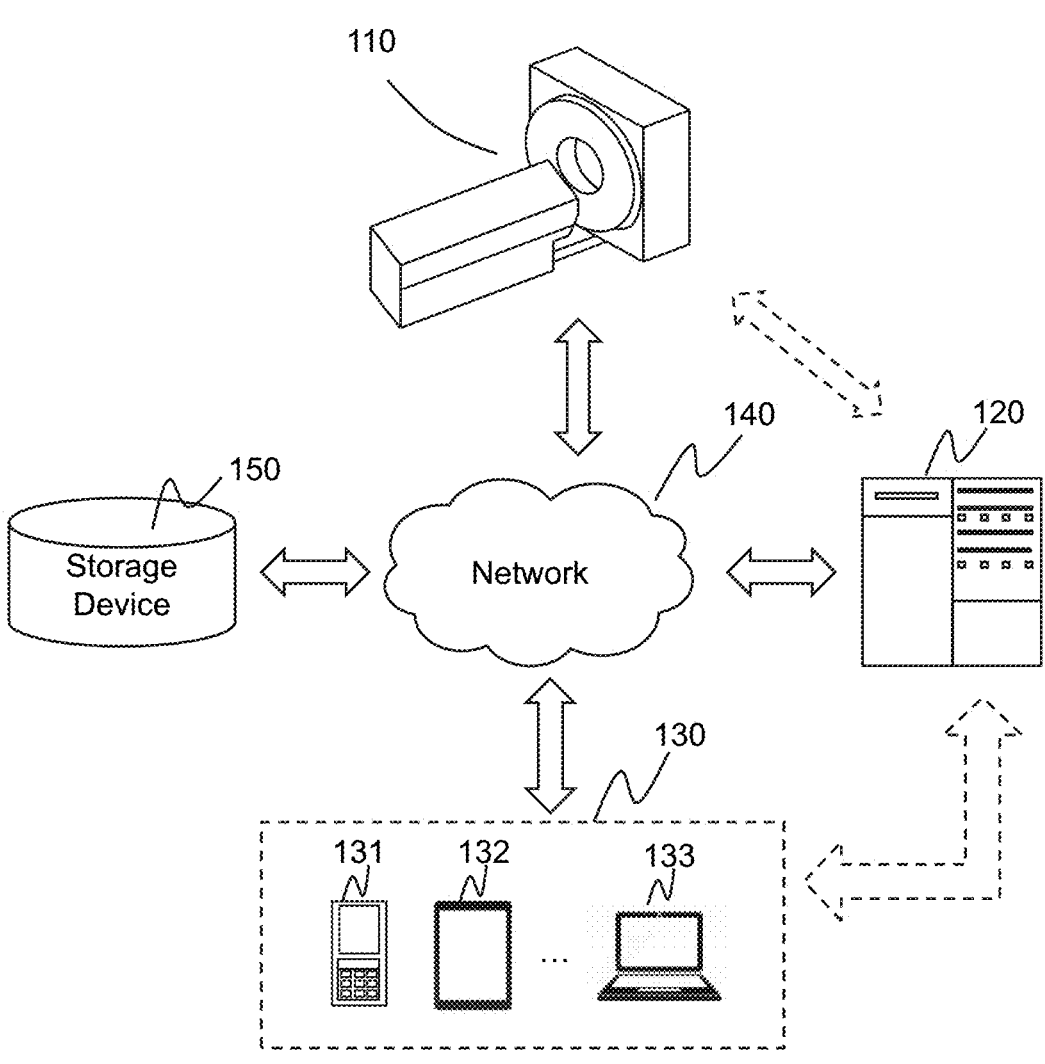
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block," as used herein, refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data) and/or images of various forms, including a two-dimensional (2D) image, a three-dimensional (3D) image, a four-dimensional (4D) image, etc.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging/treatment, such as for disease diagnostic, disease therapy, or research purposes. In some embodiments, the systems may include an imaging system. The imaging system may include a single modality system and/or a multi-modality system. The term "modality" used herein broadly refers to an imaging or treatment method or technology that gathers, generates, processes, and/or analyzes imaging information of a subject or treatments the subject. The single modality system may include, for example, a computed tomography (CT) system, a magnetic resonance imaging (MRI) system, an ultrasonography system, a positron emission tomography (PET) system, an X-ray imaging system, a digital radiography (DR) system, a digital subtraction angiography (DSA) system, an optical coherence tomography (OCT) imaging system, an ultrasound (US) imaging system, an intravascular ultrasound (IVUS) imaging system, a near-infrared spectroscopy (NIRS) imaging system, or the like, or any combination thereof. The multi-modality system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a positron emission tomography-magnetic resonance imaging (PET-MRI) system, a digital subtraction angiography-magnetic resonance imaging (DSA-MRI) system, an image-guided radiotherapy (IGRT) system, etc. It should be noted that the medical system described below is merely provided for illustration purposes, and not intended to limit the scope of the present disclosure.

In the present disclosure, the subject may include a biological object and/or a non-biological object. The biological subject may be a human being, an animal, a plant, or a specific portion, organ, and/or tissue thereof. For example, the subject may include a head, a neck, a thorax, a heart, a stomach, a blood vessel, a soft tissue, a tumor, a nodule, or the like, or any combination thereof. In some embodiments, the subject may be a man-made composition of organic and/or inorganic matters that are with or without life. The term "object" or "subject" are used interchangeably in the present disclosure.

In the present disclosure, a representation of an object (e.g., a patient, a subject, or a portion thereof) in an image may be referred to as an object for brevity. For instance, a representation of an organ or tissue (e.g., a heart, a liver, a lung) in an image may be referred to as an organ or tissue for brevity. Further, an image including a representation of an object may be referred to as an image of an object or an image including an object for brevity. Still further, an operation performed on a representation of an object in an image may be referred to as an operation performed on an object for brevity. For instance, a segmentation of a portion of an image including a representation of an organ or tissue from the image may be referred to as a segmentation of an organ or tissue for brevity.

In the present disclosure, a global registration refers to a registration operation performed on a whole of an image and a local registration refers to a registration operation performed on a portion of the image.

An aspect of the present disclosure relates to a system and method for image segmentation. The system may obtain a target image (e.g., an image of a brain) to be segmented. The system may also obtain a template image relating to the target image. The template image may correspond to an initial mask that reflects initial segmentations of the template image. The system may determine a first transformation and an intermediate template image by preliminarily registering the template image to the target image. The system may generate an intermediate mask based on the initial mask and the first transformation. The system may determine, based on the intermediate mask, one or more first regions from the target image and one or more second regions from the intermediate template image. The one or more second regions may correspond to the one or more first regions respectively. The system may also determine a second transformation by registering each of the one or more second regions to a corresponding first region. The system may further determine a target mask according to which the target image can be segmented based on one or more second transformations corresponding to the one or more second regions respectively and the intermediate mask.

According to some embodiments of the present disclosure, an image (e.g., a target brain image) may be segmented according to a registration manner combining a global registration and a local registration. Specifically, according to the global registration, a whole of a brain template image may be preliminarily registered to the target brain image to realize a rough registration purpose. Then region(s) with unsatisfied registration effect (i.e., the one or more second regions) may be segmented from the intermediate template image and may be registered to corresponding region(s) (i.e., the one or more first regions) of the target brain image according to the local registration. According to the global registration and the local registration, a target transformation (e.g., a target deformation field) may be determined, which can be applied to adjust an initial mask and an initial probability graph corresponding to the brain template image to determine a target mask and a target probability graph corresponding to the target brain image. The target brain image can be segmented based on the target mask. Further, an evaluation score of the brain may be determined based on the segmentation result of the target brain image and the target probability graph. Accordingly, according to the present disclosure, the registration accuracy and the segmentation accuracy can be increased, thereby improving the evaluation efficiency and accuracy.

In some embodiments, the brain template image and its corresponding initial mask and initial probability graph may be determined based on a plurality of sample brain images, which can take differences in different brains into consideration and improve the accuracy of the brain template image.

FIG. 1 is a schematic diagram illustrating an exemplary medical system according to some embodiments of the present disclosure. As illustrated, the medical system 100 may include a scanning device 110, a processing device 120, a terminal device 130, a network 140, and a storage device 150. The components of the medical system 100 may be connected in one or more of various ways. Mere by way of example, as illustrated in FIG. 1, the scanning device 110 may be connected to the processing device 120 through the network 140. As another example, the scanning device 110 may be connected to the processing device 120 directly (as indicated by the bi-directional arrow in dotted lines linking the scanning device 110 and the processing device 120). As a further example, the storage device 150 may be connected to the processing device 120 directly or through the network 140. As still a further example, the terminal device 130 may be connected to the processing device 120 directly (as indicated by the bi-directional arrow in dotted lines linking the terminal device 130 and the processing device 120) or through the network 140.

The scanning device 110 may be configured to acquire imaging data relating to a subject or a portion thereof. The scanning device 110 may scan the subject or a portion thereof that is located within its detection region and generate imaging data relating to the subject or the portion thereof. The imaging data may include an image (e.g., an image slice), projection data, or a combination thereof. In some embodiments, the imaging data may be two-dimensional (2D) imaging data, three-dimensional (3D) imaging data, four-dimensional (4D) imaging data, or the like, or any combination thereof. In some embodiments, the scanning device 110 may include a single modality imaging device. For example, the scanning device 110 may include a computed tomography (CT) device, a magnetic resonance imaging (MRI) device, a positron emission tomography (PET) device, a single-photon emission computed tomography (SPECT) device, a digital subtraction angiography (DSA), a digital radiography (DR) device, an ultrasonography device, or the like, or any combination thereof. In some embodiments, the scanning device 110 may include a multi-modality imaging device. For example, the scanning device 110 may include a PET-CT device, a PET-MR device, or the like, or a combination thereof. The following descriptions are provided with reference to the scanning device 110 being a CT device. It is understood that this is for illustration purposes and not intended to be limiting.

In some embodiments, the scanning device 110 may include a radiation source, a detector, a gantry, a table, etc. The radiation source and the detector may be mounted on the gantry. The subject may be placed on the table and moved to a scanning region of the scanning device 110. The radiation source may include a tube configured to emit radiation (e.g., X rays) traveling toward the subject. The detector may detect radiation (e.g., X-rays) emitted from the scanning region of the scanning device 110. In some embodiments, the detector may include one or more detector units. The detector unit(s) may include a scintillation detector (e.g., a cesium iodide detector, a gadolinium oxysulfide detector), a gas detector, etc. The detector unit(s) may include a single-row detector and/or a multi-rows detector.

The processing device 120 may process data and/or information obtained from the scanning device 110, the terminal device 130, and/or the storage device 150. For example, the processing device 120 may obtain a target image to be segmented. The processing device 120 may also obtain a template image relating to the target image. The template image may correspond to an initial mask that reflects initial segmentations of the template image. The processing device 120 may determine a target transformation by registering the template image to the target image through a global registration and a local registration. The processing device 120 may determine, based on the initial mask and the target transformation, a target mask according to which the target image can be segmented. As another example, the processing device 120 may obtain a plurality of sample images. Each of the plurality of sample images may correspond to an initial sample mask. The processing device 120 may register each of the plurality of sample images to a reference image according to at least one transformation. The processing device 120 may determine the template image based on the plurality of registered sample images. The processing device 120 may register each of the plurality of initial sample masks according to the at least one transformation. Then the processing device 120 may determine an initial probability graph and the initial mask based on the plurality of registered sample masks.

In some embodiments, the processing device 120 may include a central processing unit (CPU), a digital signal processor (DSP), a system on a chip (SoC), a microcontroller unit (MCU), or the like, or any combination thereof. In some embodiments, the processing device 120 may include a computer, a user console, a single server or a server group, etc. The server group may be centralized or distributed. In some embodiments, the processing device 120 may be local or remote. For example, the processing device 120 may access information and/or data stored in the scanning device 110, the terminal device 130, and/or the storage device 150 via the network 140. As another example, the processing device 120 may be directly connected to the scanning device 110, the terminal device 130 and/or the storage device 150 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 or a portion of the processing device 120 may be integrated into the scanning device 110. In some embodiments, the processing device 120 may be implemented by a computing device 200 including one or more components as described in FIG. 2.

The terminal device 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the smart mobile device may include a mobile phone, a personal digital assistant (PDA), a gaming device, a navigation device, a point of sale (POS) device, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal device 130 may be part of the processing device 120.

The network 140 may include any suitable network that can facilitate the exchange of information and/or data for the medical system 100. In some embodiments, one or more components (e.g., the scanning device 110, the processing device 120, the storage device 150, the terminal device 130) of the medical system 100 may communicate information and/or data with one or more other components of the medical system 100 via the network 140. For example, the processing device 120 may obtain image data from the scanning device 110 via the network 140. As another example, the terminal device 130 may receive a segmented image from the processing device 120 via the network 140. In some embodiments, one or more components (e.g., the scanning device 110, the processing device 120, the storage device 150, the terminal device 130) of the medical system 100 may communicate information and/or data with one or more external resources such as an external database of a third party, etc. via the network 140. For example, the processing device 120 may obtain a template image and its corresponding initial mask and initial probability graph from an external database of a vendor or manufacture that provides and/or updates the template image (e.g., a manufacture of the scanning device 110).

In some embodiments, the network 140 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 140 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 140 may include one or more network access points. For example, the network 140 may include wired and/or wireless network access points, such as base stations and/or internet exchange points, through which one or more components of the medical system 100 may be connected to the network 140 to exchange data and/or information.

The storage device 150 may store data, instructions, and/or any other information. In some embodiments, the storage device 150 may store data obtained from the scanning device 110, the terminal device 130, and/or the processing device 120. In some embodiments, the storage device 150 may store data and/or instructions that the processing device 120 may execute or use to perform exemplary methods/systems described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more other components (e.g., the scanning device 110, the processing device 120, the terminal device 130) of the medical system 100. One or more components of the medical system 100 may access the data or instructions stored in the storage device 150 via the network 140. In some embodiments, the storage device 150 may be directly connected to or communicate with one or more other components (e.g., the scanning device 110, the processing device 120, the terminal device 130) of the medical system 100. In some embodiments, the storage device 150 may be part of the processing device 120.

It should be noted that the above description of the medical system 100 is merely provided for the purposes of illustration, and not intended to limit the scope of the present disclosure. For persons having ordinary skills in the art, multiple variations and modifications may be made under the teachings of the present disclosure. For example, the medical system 100 may include one or more additional components and/or one or more components of the medical system 100 described above may be omitted. Additionally or alternatively, two or more components of the medical system 100 may be integrated into a single component. A component of the medical system 100 may be implemented on two or more sub-components.

Figure 2:
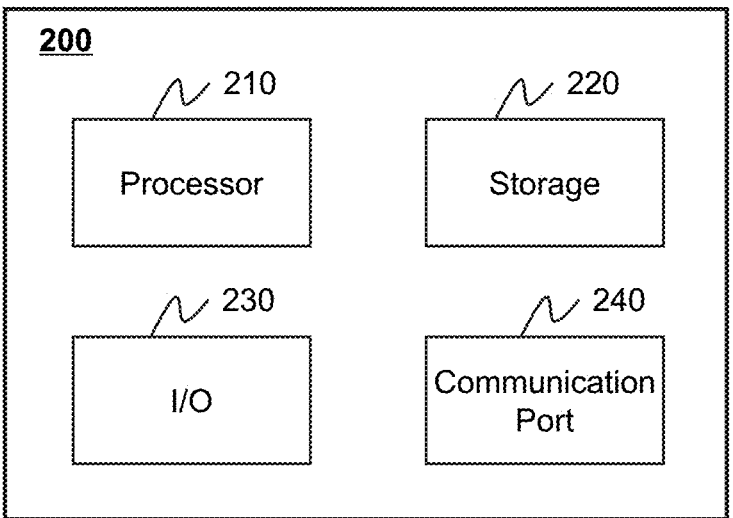
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the medical system 100 as described herein. For example, the processing device 120 and/or the terminal device 130 may be implemented on the computing device 200, respectively, via its hardware, software program, firmware, or a combination thereof. Although only one such computing device is shown for convenience, the computer functions relating to the medical system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal device 130 and/or the storage device 150. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operations A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the scanning device 110, the terminal device 130, the storage device 150, or any other component of the medical system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, a camera capturing gestures, or the like, or a combination thereof. Exemplary output devices may include a display device, a loudspeaker, a printer, a projector, a 3D hologram, a light, a warning light, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 140) to facilitate data communications. The communication port 240 may establish connections between the processing device 120 and the scanning device 110, the terminal device 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
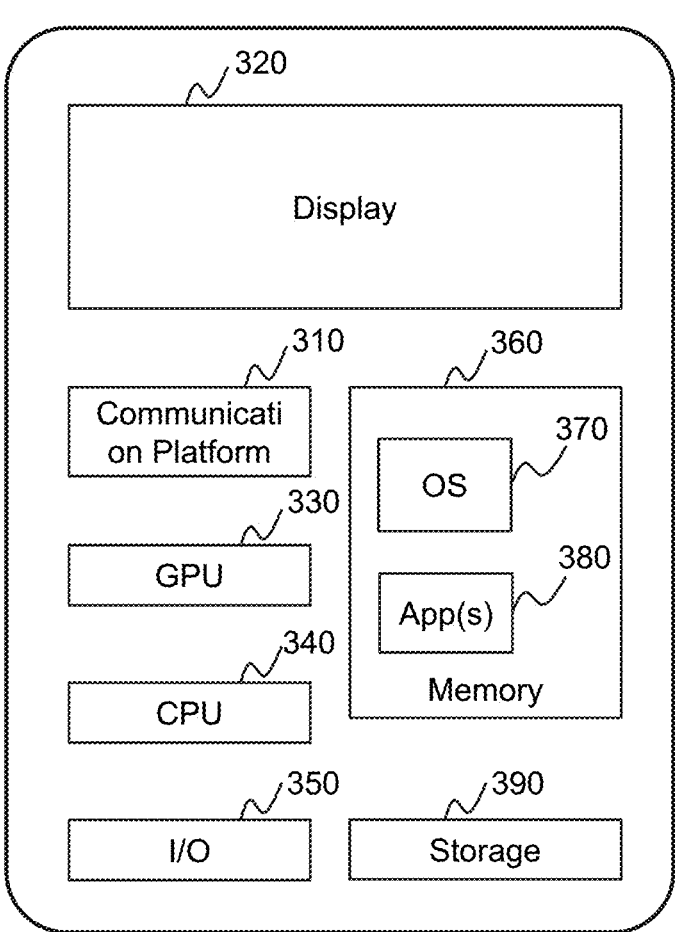
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, one or more components (e.g., the terminal device 130 and/or the processing device 120) of the medical system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone) and one or more applications 380 may be loaded into the memory 360 from the storage 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the medical system via the network 140.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
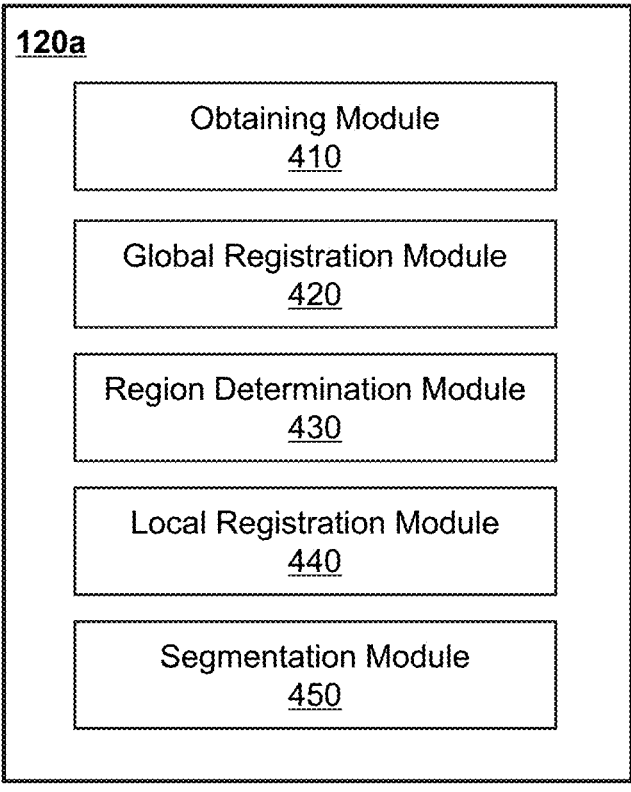
FIGS. 4A and 4B are block diagrams illustrating exemplary processing devices according to some embodiments of the present disclosure.
Figure 4B:
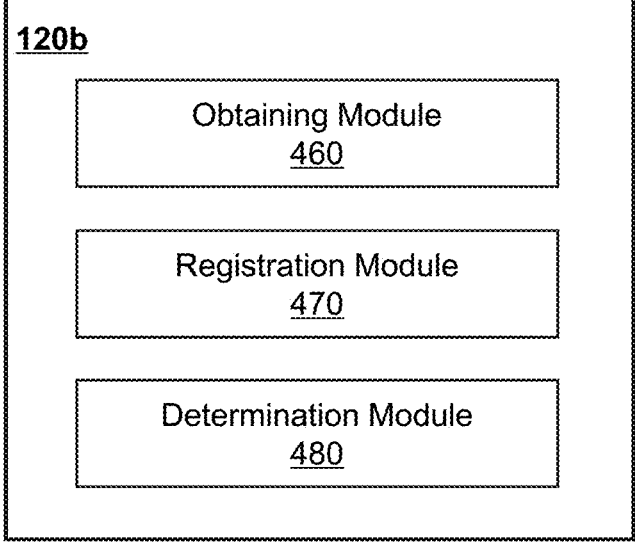

FIG. 4A and FIG. 4B are block diagrams illustrating exemplary processing devices according to some embodiments of the present disclosure. In some embodiments, as described in connection with FIG. 1, the processing device 120*a* and the processing device 120*b* may be embodiments of the processing device 120. In some embodiments, the processing device 120*a* and the processing device 120*b* may be implemented on a same device or separate devices. For example, both the processing device 120*a* and the processing device 120*b* may be implemented on the computing device 200. As another example, the processing device 120*a* may be implemented on the terminal device 300 and the processing device 120*b* may be implemented on the computing device 200.

As shown in FIG. 4A, the processing device 120*a* may include an obtaining module 410, a global registration module 420, a region determination module 430, a local registration module 440, and a segmentation module 450.

The obtaining module 410 may be configured to obtain data/information from one or more components of the medical system 100 which can be used for image segmentation. For example, the obtaining module 410 may obtain a target image to be segmented. In some embodiments, the target image to be segmented may be an image (e.g., a 2D image, a 3D image, a 4D image) relating to a subject (e.g., a patient). As another example, the obtaining module 410 may obtain a template image relating to the target image. The template image may be a reference image (e.g., a standard anatomical image) used for registering and/or segmenting the target image. The template image may correspond to an initial mask that reflects initial segmentations of the template image. More description regarding the target image and the template image may be found elsewhere in the present disclosure (e.g., operations 510 and 520 and the descriptions thereof).

The global registration module 420 may be configured for a global registration. For example, the global registration module 420 may determine a first transformation by preliminarily register the template image to the target image according to the global registration. As another example, the global registration module 420 may generate an intermediate mask based on the initial mask and the first transformation. More descriptions regarding the generation the intermediate template image and the intermediate mask may be found elsewhere in the present disclosure (e.g., operations 530 and 540 and the descriptions thereof).

The region determination module 430 may be configured to determine local regions in the target image and/or the intermediate template image. For example, the region determination module 430 may determine one or more first regions from the target image based on the intermediate mask. As another example, the region determination module 430 may determine one or more second regions from the intermediate template image based on the inter mediate mask. The one or more second regions may correspond to the one or more first regions respectively. More descriptions regarding the determination of the first region(s) and corresponding second region(s) may be found elsewhere in the present disclosure (e.g., operation 550 and the description thereof).

The local registration module 440 may be configured for local registration. For example, the local registration module 440 may determine a second transformation by registering each of the one or more second regions to a corresponding first region. Accordingly, the local registration module 440 may determine one or more second transformations corresponding to the one or more second regions respectively. More descriptions regarding the determination of the second transformation(s) may be found elsewhere in the present disclosure (e.g., operation 560 and the description thereof).

The segmentation module 450 may be configured to segment the target image. For example, the segmentation module 450 may determine a target mask based on the one or more second transformations and the intermediate mask. The segmentation module 450 may determine target segmentations of the target image based on the target mask. In some embodiments, before the segmentation of the target image, the segmentation module 450 may determine whether a further registration is needed. In some embodiments, the segmentation module 450 may determine a target probability graph based on an initial probability graph corresponding to the template image, the first transformation, and the one or more second transformations. The segmentation module 450 may determine an evaluation source of an object included in the target image based on the target segmentations and the target probability graph. More descriptions regarding the determination of the target mask and the evaluation score may be found elsewhere in the present disclosure (e.g., operation 570, FIGS. 7-9 and the descriptions thereof)

As shown in FIG. 4B, the processing device 120b may include an obtaining module 460, a registration module 470, and a determination module 480.

The obtaining module 460 may be configured to obtain image/data used for generating a template image. For example, the obtaining module 460 may obtain a plurality of sample images. Each of the sample images may correspond to an initial sample mask that reflects initial sample segmentations of the sample image. In some embodiments, each of the plurality of sample images may relate to a sample object which is a normal and healthy person (e.g., a person without any brain-related disease). As another example, the obtaining module 460 may obtain a reference image. The reference image may be a reference image (e.g., a standard anatomical image) used for registering the sample images. The reference image may be of a same type as or different from the plurality of sample images. More descriptions regarding the plurality of sample images and the reference image may be found elsewhere in the present disclosure (e.g., operations 1010 and 1020 and the descriptions thereof).

The registration module 470 may be configured to determine a registered sample image by registering the sample image to the reference image according to at least one transformation. For example, the registration module 470 may determine the at least one transformation by performing at least one registration (e.g., a registration using a transformation matrix, a registration using a deformation field) which is similar to the global registration or the local registration described elsewhere in the present disclosure. As another example, for each of the plurality of sample images, the determination module 480 may determine a registered sample mask based on an initial sample mask corresponding to the sample image and the at least one transformation. The registered sample mask may reflect registered sample segmentations corresponding to the initial sample segmentations respectively. More descriptions regarding the registration process may be found elsewhere in the present disclosure (e.g., operations 1020 and 1040 and the description thereof).

The determination module 480 may be configured to determine the template image and corresponding initial mask and initial probability graph. For example, the determination module 480 may determine the template image based on the plurality of registered sample images. As another example, for each pixel in the template image, the determination module 480 may determine probabilities of the pixel belonging to the registered sample segmentations. The determination module 480 may determine the initial probability graph and the initial mask corresponding to the template image based on the probabilities corresponding to pixels in the template image. More descriptions regarding the determination of the template image and corresponding initial mask and initial probability graph may be found elsewhere in the present disclosure (e.g., operations 1030, 1050, and 1060 and the descriptions thereof).

The modules in the processing device 120a and/or the processing device 120b may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™' a ZigBee™, a Near Field Communication (NFC), or the like, or any combination thereof. Two or more of the modules may be combined into a single module, and any one of the modules may be divided into two or more units. In some embodiments, the processing device 120a and/or the processing device 120b may share two or more of the modules. For example, the processing device 120a and the processing device 120b may share a common obtaining module, that is, the obtaining module 410 and the obtaining module 460 may be implemented via a single module. In some embodiments, the processing device 120a and/or the processing device 120b may include one or more additional modules, such as a storage module (not shown) used for storing data. In some embodiments, the processing device 120a and the processing device 120b may be integrated into a single processing device.

FIG. 5 is a flowchart illustrating an exemplary process for image segmentation according to some embodiments of the present disclosure. In some embodiments, process 500 may be implemented as a set of instructions (e.g., an application) stored in a storage device (e.g., the storage device 150, the storage 220, and/or the storage 390). The processing device 120a (e.g., the processor 210, the CPU 340, and/or one or more modules illustrated in FIG. 4A) may execute the set of instructions, and when executing the instructions, the processing device 120a may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120a (e.g., the obtaining module 410) may obtain a target image to be segmented.

In some embodiments, the target image to be segmented may be an image (e.g., a 2D image, a 3D image, a 4D image) relating to a subject (e.g., a patient). In some embodiments, the image to segmented may be an image relating to a portion of the subject. For example, the target image to be segmented may include a brain image of a patient with an ischemic stroke. In some embodiments, as described in connection with FIG. 1, the target image to be segmented may include an X-ray image, a CT image, a PET image, an MR image, a SPECT image, or the like, or any combination thereof.

In some embodiments, the target image to be segmented may be pre-generated and stored in a storage device (e.g., the storage device 150, the storage 220, and/or the storage 390) disclosed elsewhere in the present disclosure. The processing device 120a may retrieve the target image to be segmented from the storage device. In some embodiments, the target image to be segmented may be generated by the processing device 120a. For example, a CT device may be directed to perform a scan on the brain of a patient to acquire CT scanning data of the brain. The processing device 120a may obtain the CT scanning data and generate the target image by reconstructing the CT scanning data using a reconstruction algorithm. Exemplary reconstruction algorithms may include a Filter Back Projection (FBP) algorithm, an Algebraic Reconstruction Technique (ART), a Local Reconstruction Algorithm (LocalRA), an iterative reconstruction algorithm, or the like, or any combination thereof. based on the scanning data.

In 520, the processing device 120a (e.g., the obtaining module 410) may obtain a template image relating to the target image.

In some embodiments, the template image may be a reference image (e.g., a standard anatomical image) used for registering and/or segmenting the target image. In some embodiments, a type of the template image may be the same as or different from a type of the target image. For example, it is assumed that the target image is a CT image, the template image is also a CT image. As another example, it is assumed that the target image is a CT image, the template image may include an MR image. As another example, it is assumed that the target image is an image relating to the brain of a patient (which can be referred to as a "brain image"), the template image is also a brain image (e.g., a brain image relating to an ordinary person).

In some embodiments, the template image may correspond to an initial mask that reflects initial segmentations (also can be referred to as "aspects") of the template image. As used herein, the initial mask may be an image with a same size as the template image, which is labeled by a label sequence including a plurality of labels (e.g., 0, 1, 2, 3, . . . ), wherein the plurality of labels correspond to the initial segmentations respectively. Accordingly, for a specific initial segmentation (e.g., an initial segmentation labeled by "1"), pixels in the specific initial segmentation correspond to a same label (e.g., "1"). In some embodiments, the initial mask may be displayed in different forms. For example, different initial segmentations may be displayed in different colors. As another example, the initial segmentations may be displayed with contour lines.

In some embodiments, the template image may also correspond to an initial probability graph. For each pixel in the template image, the initial probability graph may reflect a probability of the pixel belonging to its corresponding initial segmentation.

In some embodiments, the template image and/or its corresponding initial mask and/or initial probability graph may be pre-generated and stored in a storage device (e.g., the storage device 150, the storage 220, or the storage 390) of the medical system 100 or an external source. The processing device 120a may access the storage device and retrieve the template image. In some embodiments, the template image and/or its corresponding initial mask and/or initial probability graph may be generated by a computing device (e.g., the processing device 120b) of the medical system 100. More descriptions regarding the generation of the template image and/or its corresponding initial mask and/or initial probability graph may be found elsewhere in the present disclosure (e.g., FIG. 10 and relevant description thereof).

In 530, the processing device 120a (e.g., the global registration module 420) may determine a first transformation and an intermediate template image by preliminarily registering the template image to the target image. As used herein, the first transformation indicates a transformation relationship between the template image and the target image. The intermediate image may be generated based on the template image and the first transformation. A size of the intermediate template image may be the same as that of the target image.

In some embodiments, the processing device 120a may preliminarily register the template image to the target image by performing a global registration. The global registration may include a first registration (e.g., a rigid registration), a second registration (e.g., a non-rigid registration), etc. In some embodiments, the first registration may include a registration (e.g., an affine transformation) using a transformation matrix; the second registration may include a registration using a deformation field. For example, the processing device 120a may perform the first registration by multiplying the template image with a transformation matrix. Each pixel in the template image may be transformed according to the transformation matrix. The processing device 120a may then perform the second registration by transforming the template image with the first registration performed (can be referred to as a "first registered template image") according to a deformation field including a plurality of vectors. Each pixel in the first registered template image may be transformed according to one of the plurality of vectors in the deformation field. According to the first registration, the template image may be roughly aligned with the target image. According to the second registration, the template image may be relatively finely aligned with the target image.

In some embodiments, the global registration may include one or more iterations. Taking a current iteration of the one or more iterations as an example, the processing device 120a may register the template image to the target image according to a current registration by optimizing a previous transformation and generate a currently registered template image according to the current registration. Further, the processing device 120a may determine whether a termination condition is satisfied in the current iteration. In response to determining that the termination condition is satisfied, the processing device 120a may determine a current transformation of the current registration as the first transformation. In response to determining that the termination condition is not satisfied, the processing device 120a may update the current transformation in a next iteration. In some embodiments, the termination condition may include that a difference between the currently registered template image (or the current transformation) and a previously registered template image (or the previous transformation) is minimal or smaller than a threshold (e.g., a constant). Alternatively or additionally, the termination condition may include that a count of iterations that have been performed is greater than a preset count.

In 540, the processing device 120a (e.g., the global registration module 420) may generate an intermediate mask based on the initial mask and the first transformation.

In some embodiments, the processing device 120a may transform the initial mask according to the first transformation. For example, as described in connection with 530, it is assumed that the first transformation includes the transformation matrix and the deformation field, the processing device 120a may multiply the initial mask with the transformation matrix and transform the multiplied initial mask according to the deformation field to generate the intermediate mask.

In 550, the processing device 120a (e.g., the region determination module 430) may determine, based on the intermediate mask, one or more first regions from the target image and one or more second regions from the preliminary registered template image, wherein the one or more second regions correspond to the one or more first regions respectively.

In some embodiments, the processing device 120a may segment the target image based on the intermediate mask to obtain one or more first segmentations. The processing device 120a may segment the intermediate template image based on the intermediate mask to obtain one or more second segmentations. The one or more first segmentations may correspond to the one or more second segmentations respectively. In some embodiments, the processing device 120a may determine a similarity value between each of the one or more first segmentations and a corresponding second segmentation. Then the processing device 120a may determine the one or more first regions and the one or more second regions based on similarity values between the first segmentations and the second segmentations.

For example, the processing device 120 may select, from the similarity values, similarity value(s) less than a similarity threshold. The processing device 120a may identify first segmentation(s) and second segmentation(s) corresponding to the selected similarity value(s). In some embodiments, the processing device 120a may determine the identified first segmentation(s) or a portion thereof as the one or more first regions; and determine the identified second segmentation (s) or a portion thereof as the one or more second regions. Accordingly, a similarity value between each of the one or more first regions and its corresponding second region is less than the similarity threshold. Alternatively or additionally, take a specific identified first segmentation and a corresponding identified second segmentation as an example, the processing device 120a may determine a region including the identified first segmentation in the target image as a first region; and determine a region including the identified second segmentation in the intermediate template image as a second region. That is, the first region is relatively larger than the identified first segmentation and the second region is relatively larger than the identified second segmentation, which can ensure that the one or more first regions and the one or more second regions include sufficient information for further registration and can avoid that information in a first region does not match information in its corresponding second region.

In 560, the processing device 120a (e.g., the local registration module 440) may determine a second transformation by registering each of the one or more second regions to a corresponding first region. As used herein, the second transformation indicates a transformation relationship between each of the one or more second regions and the corresponding first region.

In some embodiments, for each of the one or more second regions, the processing device 120a may register the second region to a corresponding first region by performing a local registration. As described in connection with above, the local registration may include a third registration. In some embodiments, the third registration may include a registration using a deformation field. In some embodiments, the third registration may be similar to the second registration described in operation 530 and a deformation degree corresponding to the third registration may be greater than that corresponding to the second registration. The processing device 120a may perform the third registration by transforming the second region according to a deformation field including a plurality of vectors. Each pixel in the second region may be transformed according to one of the plurality of vectors.

In some embodiments, the local registration may also include a fourth registration that is similar to the first registration. Accordingly, during the local registration, the processing device 120a may register the second region to a corresponding first region according to the fourth registration. Then the processing device 120a may register the registered second region to the corresponding first region according to the third registration.

In some embodiments, the local registration may include one or more iterations that are similar to the iteration(s) of the global registration and not repeated herein.

In 570, the processing device 120a (e.g., the segmentation module 450) may determine a target mask according to which the target image can be segmented based on one or more second transformations corresponding to the one or more second regions respectively and the intermediate mask.

In some embodiments, the processing device 120a may determine a target transformation (e.g., a target deformation field) based on the one or more second transformations. Then the processing device 120a may determine the target mask by transforming the intermediate mask according to the target transformation (e.g., the target deformation field). Each pixel in the intermediate mask may be transformed according to a vector in the target transformation (e.g., the target deformation field).

In some embodiments, it is assumed that the target image is a brain image, since a left part and a right part of the brain have some symmetry, the processing device 120a may determine whether the registration result between the target image and the template image is accurate based on the symmetrical characteristics and accordingly determine whether a further registration is needed. More descriptions regarding the determination of the target mask may be found elsewhere in the present disclosure (e.g., FIGS. 7-9 and the descriptions thereof).

In some embodiments, after determining the target mask, the processing device 120a may determine target segmentations of the target image based on the target mask. Then the processing device 120a may determine an evaluation score of an object included in the target image based on the target segmentations of the target image. Take the target image relating to a brain as an example (i.e., the target image is a brain image), the processing device 120a may determine a target probability graph based on the initial probability graph corresponding to the template image, the first transformation, and the one or more second transformations, which is similar to the determination of the target mask and not repeated herein. The target probability graph may indicate a probability of each pixel in the target image belonging to its corresponding target segmentation. Then the processing device 120a may determine an evaluation score of the brain based on the target segmentations of the target image and the target probability graph.

Merely by way of example, for a brain image, there are generally 20 target aspects (i.e., target segmentations). For each target segmentation (or each aspect), the processing device 120a may evaluate a score of the target segmentation based on probabilities of pixels in the target segmentation. The greater a probability of a pixel belonging to its target segmentation is, the greater a weight of the pixel may be, and the more the pixel contributes to the score of the target segmentation. The processing device 120a may determine an evaluation score of the brain based on scores of the target segmentations (e.g., by summing the scores of the target segmentations). The evaluation score may reflect an ischemic condition of the brain of the patient. A user (e.g., a doctor or an operator) of the medical system 100 can use the evaluation scores for diagnosis, treatment planning, and/or prognosis evaluation for the patient.

In some situations, for a potential patient with an ischemic stroke, a scan may be performed on the patient to obtain a brain image of the patient. The brain image of the patient may be divided into two parts (e.g., a left part and a right part) along a center axis of the brain. Each of the two parts may be segmented into 10 aspects relating to the middle cerebral artery (MCA) area of the brain. Accordingly, there are 20 aspects and each of the 20 aspects corresponds to an evaluation score. The 20 evaluation scores corresponding to the 20 aspects respectively may indicate physiological information of the patient, which can be used for treatment planning and/or prognosis evaluation of the patient. However, there is no distinct boundary among a portion of the 20 aspects and the 20 aspects may have different deformation degrees, which results in that traditional segmentation based on global registration cannot reach a satisfactory segmentation result, thereby reducing an evaluation effect for the patient. Accordingly, according to the embodiments of the present disclosure, both a global registration and a local registration are used to register the target image and the template image, which can increase the registration accuracy and the segmentation accuracy, thereby improving the evaluation efficiency and accuracy.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, one or more additional operations may be added in the process 500. For example, a storing operation may be added elsewhere in the process 500. In the storing operation, the processing device 120a may store information and/or data generated and/or used in the process 500 in a storage device (e.g., the storage device 150) disclosed elsewhere in the present disclosure. As another example, an additional operation for segmenting the target image based on the target mask may be added after operation 570. In some embodiments, two or more operations in the process 500 may be executed in a single operation. For example, operations 530 and 540 may be combined as a single operation in which the processing device 120a may both preliminarily register the template image to the target image and generate an intermediate mask.

Figure 6:
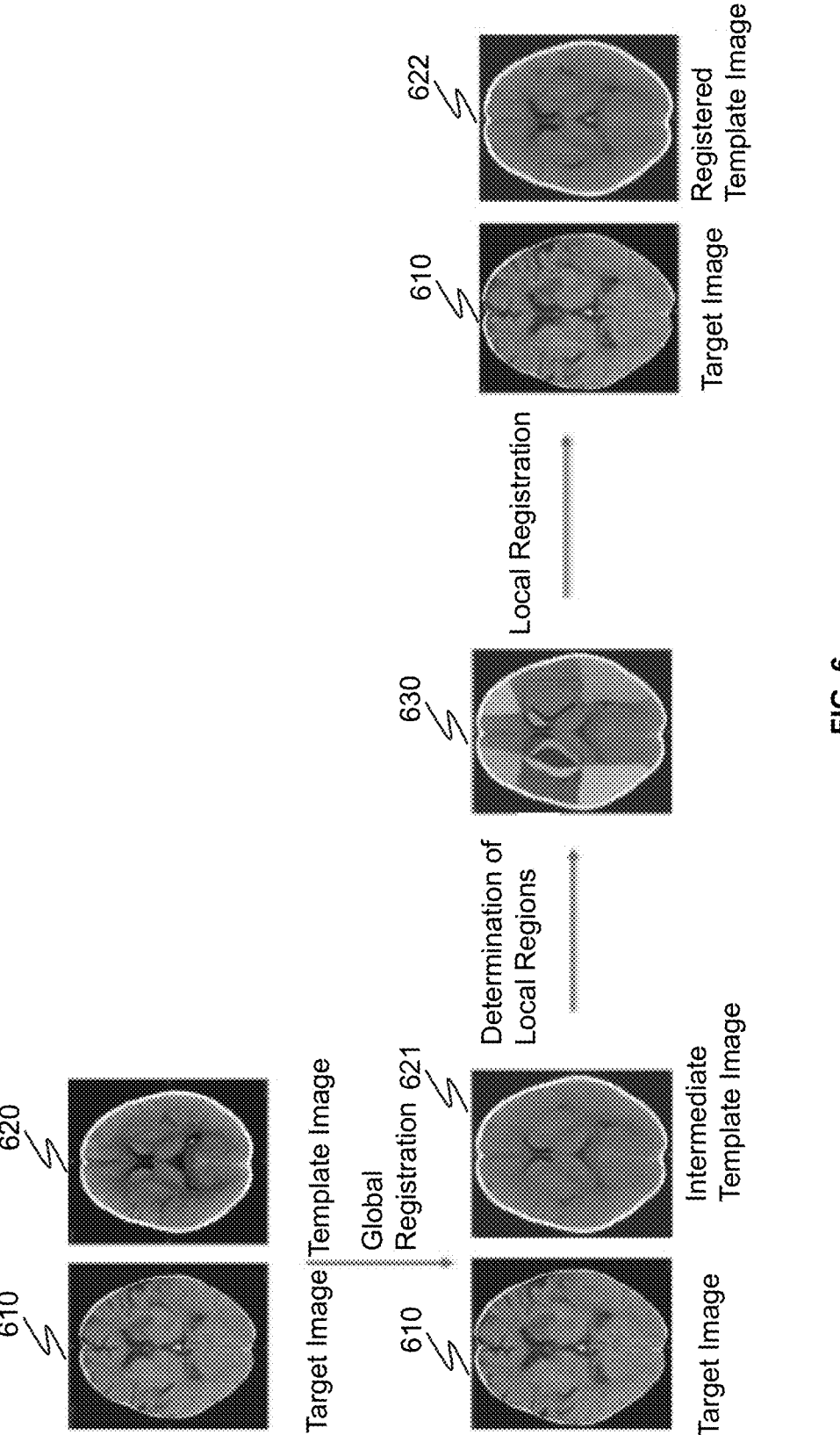
FIG. 6 is a schematic diagram illustrating an exemplary image segmentation according to some embodiments of the present disclosure.

FIG. 6 is a schematic diagram illustrating an exemplary image segmentation according to some embodiments of the present disclosure. As shown in FIG. 6, a target image 610 to be segmented is a CT image of a brain of a potential patient with an ischemic stroke. A template image 620 is a CT template image of a brain and corresponds to an initial mask (not shown). The template image 620 was preliminarily registered to the target image 610 by a global registration and an intermediate template image 621 was generated. A first transformation was determined based on the global registration. Then the initial mask was transformed according to the first transformation and an intermediate mask 630 was obtained. As described in connection with operation 550, local regions (e.g., one or more first regions) in the target image 610 and corresponding local regions (e.g., one or more second regions) in the intermediate template image 621 were determined based on the intermediate mask 630. As described in connection with operation 560, each of the local regions in the intermediate template image 621 was registered to a corresponding local region in the target image 610 by a local registration and a second transformation was determined based on the local registration. Then a target transformation (e.g., a target deformation field) was determined based on the second transformations corresponding to the local regions. Further, a registered template image 622 was generated by transforming the intermediate template image 621 according to the target transformation and a target mask (not shown) was generated by transforming the intermediate mask 630 according to the target transformation. Furthermore, the target image 610 can be segmented based on the target mask for further processing (e.g., diagnosis, treatment planning, or prognosis evaluation) for the patient.

FIG. 7 is a flowchart illustrating an exemplary process for determining a target mask according to some embodiments of the present disclosure. In some embodiments, process 700 may be implemented as a set of instructions (e.g., an application) stored in a storage device (e.g., the storage device 150, storage 220, and/or storage 390). The processing device 120a (e.g., the processor 210, the CPU 340, and/or one or more modules illustrated in FIG. 4A) may execute the set of instructions, and when executing the instructions, the processing device 120a may be configured to perform the process 700. The operations of the illustrated process presented below are intended to be illustrative. In some embodiments, operation 570 in FIG. 5 may be achieved by implementing the process 700.

In 710, the processing device 120a (e.g., the segmentation module 450) may determine an initial deformation field corresponding to the intermediate template image.

In some embodiments, the initial deformation field may be a displacement field with zero displacement. In some embodiments, the initial deformation field may match a size of the intermediate mask. For example, the initial deformation field may include a plurality of vectors each indicating an initial displacement (e.g., a zero displacement) of a pixel in the intermediate mask.

In 720, the processing device 120a (e.g., the segmentation module 450) may determine a target transformation (e.g., a target deformation field) based on the initial deformation field and the one or more second transformations (e.g., one or more second deformation fields).

In some embodiments, the processing device 120a may determine an intermediate deformation field by combining the initial deformation field and the one or more second deformation fields. For example, as described in connection with operation 560, for each of the one or more second regions in the intermediate template image, the second deformation field is determined by registering the second region to a corresponding to first region. Accordingly, for any pixel in the second region, the second deformation field indicates a displacement vector (e.g., a three-dimensional vector) of the pixel. Then the processing device 120a may combine the initial deformation field and the one or more second deformation fields based on the displacement vectors. Further, the processing device 120a may determine the target transformation (e.g., the target deformation field) by smoothing the intermediate deformation field. For example, the processing device 120a may perform a blur operation on a combination edge of each second deformation field and the initial deformation field.

In 730, the processing device 120a (e.g., the segmentation module 450) may determine the target mask based on the target transformation (e.g., the target deformation field) and the intermediate mask.

In some embodiments, the processing device 120a may determine the target mask by transforming the intermediate mask according to the target deformation field. Each pixel in the intermediate mask may be transformed according to a vector in the target deformation field.

In some embodiments, the processing device 120a may determine a registered template image based on the target transformation (e.g., the target deformation field) and the intermediate template image. The processing device 120a may determine whether a further registration is needed based on the registered template image and the target image. In response to determining that no further registration is needed, the processing device 120a may transform the intermediate mask according to the target transformation (e.g., the target deformation field) to determine the target mask. In response to determining that a further registration is needed, the processing device 120a may perform a further registration on the registered template image to determine a further transformation. The processing device 120a may determine the target mask based on the intermediate mask, the target transformation (e.g., the target deformation field), and the further transformation. More descriptions regarding the determination of the target mask may be found elsewhere in the present disclosure (e.g., FIGS. 8 and 9 and the descriptions thereof).

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations of the process 700 may be omitted and/or one or more additional operations may be added in the process 700. For example, a storing operation may be added in the process 700. In the storing operation, the processing device 120b may store data generated and/or used in the process 700 in a storage device (e.g., the storage device 150) disclosed elsewhere in the present disclosure. As another example, operations 710 and 720 may be implemented in a single operation.

FIG. 8 is a flowchart illustrating an exemplary process for determining a target mask according to some embodiments of the present disclosure. In some embodiments, process 800 may be implemented as a set of instructions (e.g., an application) stored in a storage device (e.g., the storage device 150, storage 220, and/or storage 390). The processing device 120a (e.g., the processor 210, the CPU 340, and/or one or more modules illustrated in FIG. 4A) may execute the set of instructions, and when executing the instructions, the processing device 120a may be configured to perform the process 800. The operations of the illustrated process presented below are intended to be illustrative. In some embodiments, operation 730 in FIG. 7 may be achieved by implementing the process 800.

As described in connection with FIG. 5, it is assumed that the target image is a brain image, since a left part and a right part of the brain have some symmetry, the processing device 120a may determine whether the registration result between the target image and the template image is accurate based on the symmetrical characteristics and accordingly determine whether a further registration is needed. For example, in some situations, a patient with an ischemic stroke is often accompanied by old cerebral infarction. Generally, in the brain image of the patient, the grayscale of the old cerebral infarction region is significantly different from that of normal tissues, which may have a relatively large impact on the registration result and then affect the accuracy of the segmentation result. Therefore, according to the embodiments of the present disclosure, process 800 may be performed to determine whether a further registration is needed based on the symmetrical characteristics of the brain and determine a final target mask further based on the further registration.

In 810, the processing device 120a (e.g., the segmentation module 450) may determine a registered template image based on the target transformation (e.g., the target deformation field) and the intermediate template image.

In some embodiments, the processing device 120 may determine the registered template image by transforming the intermediate template image according to the target deformation field. Each pixel in the intermediate template image may be transformed according to a corresponding vector in the target deformation field.

In 820, the processing device 120a (e.g., the segmentation module 450) may determine a first similarity value (also referred to as a "left similarity value") between a left part of the target image and a left part of the registered template image.

In 830, the processing device 120a (e.g., the segmentation module 450) may determine a second similarity value (also referred to as a "right similarity value") between a right part of the target image and a right part of the registered template image.

As described above, since the brain a left part and a right part of the brain have some symmetry, the processing device 120a may divide the target image into the left part and the right part along a central axis of the target image. Similarly, the processing device 120a may divide the registered template image into the left part and the right part along a central axis of the registered template image. Then the processing device 120a may determine the first similarity value and the second similarity value using a similarity algorithm. The similarity algorithm may include a Euclidean distance algorithm, a Manhattan distance algorithm, a Minkowski distance, a cosine similarity algorithm, a Jaccard similarity algorithm, a Pearson correlation algorithm, or the like, or any combination thereof. Merely by way of example, the processing device 120a may determine a first feature vector of the left part of the target image and a second feature vector of the right part of the registered template image. The processing device 120 may determine the first similarity value based on the first feature vector and second feature vector using the cosine similarity algorithm.

In 840, the processing device 120a (e.g., the segmentation module 450) may determine whether the first similarity value and the second similarity satisfy a preset condition.

In response to determining that the first similarity value and the second similarity value satisfy the preset condition, the process 800 may proceed to operation 850. In response to determining that the first similarity value and the second similarity value do not satisfy the preset condition, the process 800 may proceed to 880.

In some embodiments, the preset condition may include that a difference between the first similarity value and the second similarity value is greater than a preset difference. For example, the processing device 120a may determine the difference between the first similarity value and the second similarity value. The processing device 120a may determine whether the difference is greater than the preset difference. In response to determining that the difference is greater than the preset difference, the processing device 120a may determine that the first similarity value and the second similarity value satisfy the preset condition. In response to determining that the difference is less than or equal to the preset difference, the processing device 120a may determine that the first similarity value and the second similarity value do not satisfy the preset condition.

In some embodiments, the preset condition may include that a ratio between the first similarity value and the second similarity value is greater than a first preset ratio, a ratio between the first similarity value and the second similarity value is less than a second preset ratio, etc. The first ratio may be greater than 1. The second ratio may be less than 1. For example, the processing device 120a may determine the ratio between the first similarity value and the second similarity value. The processing device 120a may determine whether the ratio is greater than the first ratio or the ratio is less than the second ratio. In response to determining that the ratio is greater than the first ratio or the ratio is less than the second ratio, the processing device 120a may determine that the first similarity value and the second similarity value satisfy the preset condition. In response to determining that the ratio is less than or equal to the first ratio or the ratio is greater than or equal to the second ratio, the processing device 120a may determine that the first similarity value and the second similarity value do not satisfy the preset condition.

In 850, in response to determining that the first similarity value and the second similarity value satisfy the preset condition, the processing device 120a (e.g., the segmentation module 450) may determine a turned template image by performing a turning operation on a part of the registered template image. The part may correspond to one of the left part and the right part that corresponds to a greater similarity value. For example, if the part is the right part of the registered template image, the turned template image may refer to the turned right part of the registered template image. As another example, if the part is the left part of the registered template image, the turned image may refer to the turned left part of the registered template image.

In some embodiments, the processing device 120a may determine whether the first similarity value is greater than the second similarity value. In response to determining that the first similarity value is greater than the second similarity value, the processing device 120a may determine the turned template image by performing a turning operation on the left part of the registered template image. In response to determining that the first similarity value is less than the second similarity value, the processing device 120a may determine the turned template image by performing a turning operation on the right part of the registered template image.

In 860, the processing device 120a (e.g., the segmentation module 450) may determine a third transformation by registering the turned template image to the target image.

For example, if the turned template image is a turned right part of the registered template image, the processing device 120a may register the turned right part of the registered template to the left part of the target image. As another example, if the turned template image is a turned left part of the registered template image, the processing device 120a may register the turned left part of the registered template to the right part of the target image.

Alternatively or additionally, the processing device 120a may determine a modified template based on the turned template image and register the modified template image to the target image. For example, if the turned template image is a turned right part of the registered template image, the modified template image may be an image including a right part of the registered template image and the turned right part (which acts as a modified left part) of the registered template image. As another example, if the turned template image is a turned left part of the registered template image, the modified template image may be an image including a left part of the registered template image and the turned left part (which acts as a modified right part) of the registered template image.

In some embodiments, the processing device 120a may register the turned template image to the target image according to a registration (e.g., the first registration) which includes a relatively small deformation degree. According to the registration, the turned template image may be roughly registered to the target image.

In 870, the processing device 120a (e.g., the segmentation module 450) may determine the target mask based on the target transformation (e.g., the target transformation field), the third transformation, and the intermediate mask.

In some embodiments, the processing device 120a may determine a registered mask corresponding to the registered template image based on the target deformation field and the intermediate mask. The processing device 120a may divide the registered mask into a left part and a right part along a central axis of the registered mask. The processing device 120a may determine a turned mask by performing a turning operation on a part of the registered mask. As described above, the part corresponds to the part of the registered template image with a greater similarity value. For example, if the part is the right part of the registered mask, the turned mask may refer to the turned right part of the registered mask. As another example, if the part is the left part of the registered mask, the turned mask may refer to the turned left part of the registered mask.

Further, the processing device 120a may determine a transformed mask by transforming the turned mask according to the third transformation and determine the target mask based on the transformed mask. For example, if the turned mask is the turned right part of the registered mask, the processing device 120a may determine the target mask by combing the transformed mask and the left part of the registered mask. As another example, if the turned mask is the turned left part of the registered mask, the processing device 120a may determine the target mask by combining the transformed mask and the right part of the registered mask.

In 880, in response to determining that the first similarity value and the second similarity value do not satisfy the preset condition, the processing device 120a (e.g., the segmentation module 450) may determine the target mask based on the target deformation field and the intermediate mask. That is, no further registration is needed and the processing device 120a may directly determine the target mask based on the target deformation field and the intermediate mask.

It should be noted that the above descriptions regarding the process 800 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 800 may be accomplished with one or more additional operations not described and/or without one or more of the operations discussed. For example, operations 820 and operations 830 may be implemented in a single operation. Additionally, the order of the operations of the process 800 is not intended to be limiting.

Figure 9:
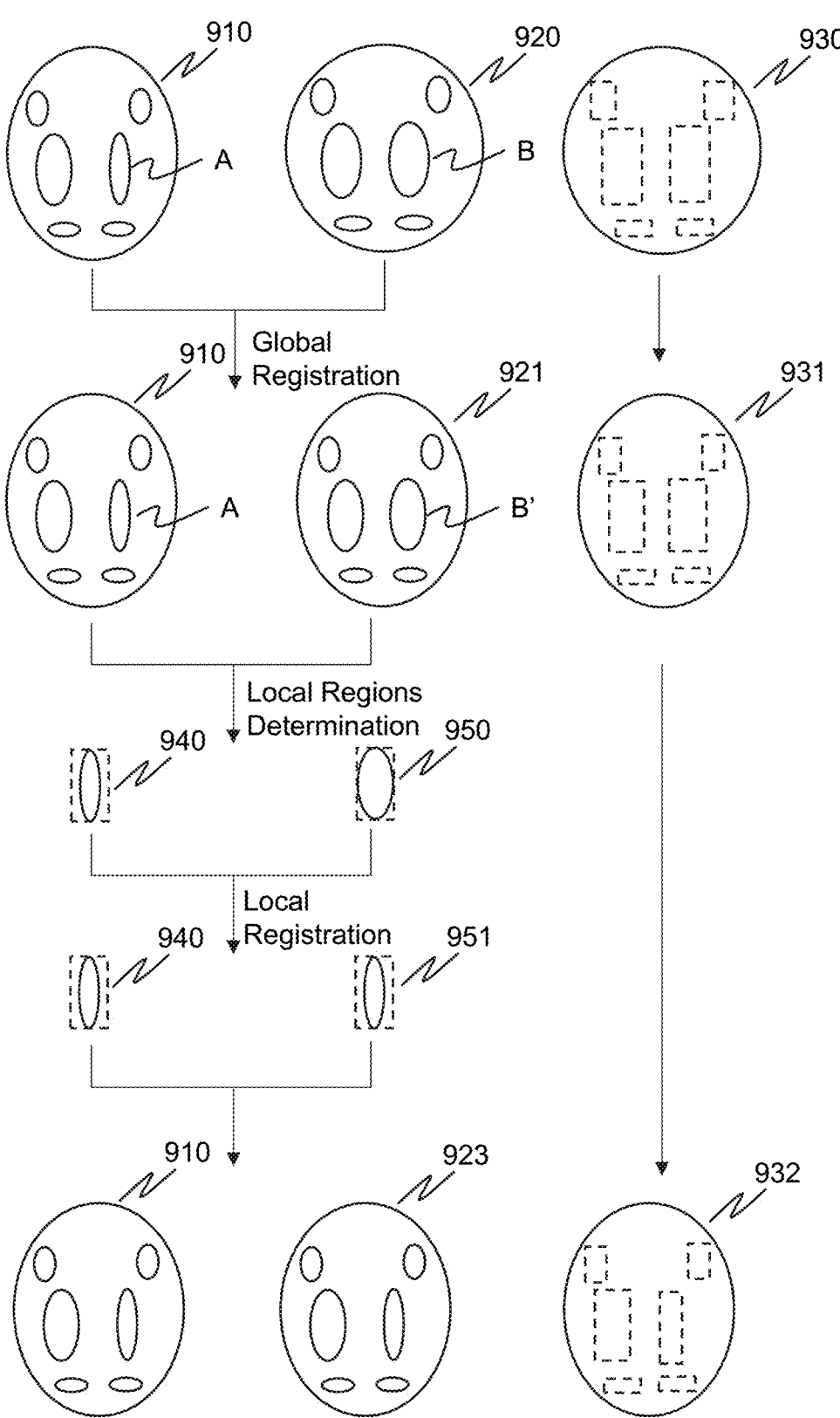
FIG. 9 is a schematic diagram illustrating an exemplary process for image segmentation according to some embodiments of the present disclosure.

FIG. 9 is a schematic diagram illustrating an exemplary process for image segmentation according to some embodiments of the present disclosure. As shown in FIG. 9, the processing device 120a may obtain a target image 910 to be segmented and a template image 920 relating to target image 910. The template image 910 may correspond to an initial mask 930. As illustrated, it is assumed that both the target image 910 and the template 910 include six regions.

As described in connection with operation 530, the processing device 120a may preliminarily register the template image 920 to the target image 910 by performing a global registration and accordingly determine an intermediate template image 921. Then the processing device 120a may determine an intermediate mask 631 based on the initial mask 630 and a first transformation determined during the global registration.

Further, take a region B in the template image 920 and a corresponding region A in the target image 910 as an example, since the region A includes a relatively large deformation, after the global registration, a similarity value between the region A and a corresponding region B' in the intermediate template image 921 may be less than a similarity threshold. Accordingly, as described in connection with operation 550, the processing device 120a may determine, based on the intermediate mask 931, a first region 940 including the region A from the target image 610 and a second region 950 including the region B from the intermediate template image 921. Then, described in connection with operation 560, the processing device 120a may register the second region 950 to the first region 940 by performing a local registration and accordingly determine a registered second region 951.

Furthermore, the processing device 120a may determine a target deformation field based on a second transformation determined during the local transformation and determine a target mask 932 based on the intermediate mask 931 and target deformation field. Accordingly, the processing device 120a may segment the target image 910 based on the target mask 932. Also, the processing device 120a may determine a registered template image 923 based on the target deformation field and the intermediate template image 921.

FIG. 10 is a flowchart illustrating an exemplary process for determining a template image and its corresponding initial probability graph and initial mask according to some embodiments of the present disclosure. In some embodiments, process 1000 may be implemented as a set of instructions (e.g., an application) stored in a storage device (e.g., the storage device 130, storage 220, and/or storage 390). The processing device 120b (e.g., the processor 210, the CPU 340, and/or one or more modules illustrated in FIG. 4B) may execute the set of instructions, and when executing the instructions, the processing device 120b may be configured to perform the process 1000. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 7 and described below is not intended to be limiting. In some embodiments, the process 1000 may be implemented online or offline. In some embodiments, the process 1000 may be performed by another device or system (e.g., a device or system of a vendor of a manufacturer) other than the medical system 100. For illustration purposes, the implementation of the process 1000 by the processing device 120b is described as an example.

In 1010, the processing device 120b (e.g., the obtaining module 460) may obtain a plurality of sample images each of which corresponds to an initial sample mask that reflects initial sample segmentations of the sample image. As used herein, the initial sample mask may be an image of a same size as its corresponding sample image.

In some embodiments, the plurality of sample images may be of the same type. For example, each of the plurality of sample images may be a CT image, an MRI image, etc. As another example, each of the plurality of sample images may be an image relating a portion (e.g., a brain) of a sample object. For illustration purposes, the following description is provided with reference to a plurality of sample CT brain images. In such situations, the sample object refers to a normal and healthy person (e.g., a person without any brain-related disease).

In some embodiments, each of the plurality of sample images may be a pre-processed image. For example, the processing device 120b may obtain a plurality of initial images each relating to the head of a sample object. Each of the plurality of initial images may be reconstructed based on imaging data that is acquired by scanning the head of the sample object using a CT device. For each of the plurality of initial images, the processing device 120b may determine the skull and regions outside the skull in the initial image and determine a corresponding sample image by setting the skull and the regions as background, for example, set pixels corresponding to the skull and the regions as a specified value (e.g., a background value). In some embodiments, the plurality of sample images may be pre-generated and stored in a storage device described elsewhere in the present disclosure. The processing device 112b may obtain the plurality of sample images directly from the storage device.

In some embodiments, for each sample image, the initial sample mask corresponding to the sample image may be manually determined by an operator (e.g., a doctor or a technician) or may be determined automatically (e.g., through machine learning or big data analysis). For example, for each sample image, the processing device 120b may receive a user input relating to the initial sample segmentations of the sample image from the operator. The processing device 120b may determine the initial sample mask based on the user input. As described in connection with operation 520, the initial sample mask may be labeled by a label sequence including a plurality of labels (e.g., 0, 1, 2, 3, . . . ), wherein the plurality of labels correspond to the initial sample segmentations respectively. Accordingly, for a specific initial sample segmentation (e.g., an initial sample segmentation labeled by "1"), pixels in the specific initial sample segmentation correspond to a same label (e.g., "1").

In 1020, for each of the plurality of sample images, the processing device 120b (e.g., the registration module 470) may determine a registered sample image by registering the sample image to a reference image according to at least one transformation.

In some embodiments, the reference image may be a reference image (e.g., a standard anatomical image) used for registering the sample images. In some embodiments, the reference image may indicate an internal structure of a reference object which may be a biological subject or a non-biological subject that has a similar internal structure with the sample objects. For example, as described above, the sample object may be a normal and healthy person, accordingly, the reference object may be an ordinary or average-level person or a virtual human body. In some embodiments, a type of the reference image may be the same as or different from that of the plurality of sample images. For example, it is assumed that the plurality of sample images are CT images, the reference image may be a CT image. As another example, it is assumed that the plurality of sample images are CT images, the reference image may be an MRI image. As a further example, it is assumed that the plurality of sample images are brain images, the reference image may be also a brain image.

In some embodiments, the processing device 120b may determine the at least one transformation by performing at least one registration (e.g., a registration using a transformation matrix, a registration using a deformation field) which is similar to the global registration or the local registration described elsewhere in the present disclosure. Take a specific sample brain image as an example, the processing device 120b may register the sample brain image to a reference brain image by performing a global registration. For example, the processing device 120b may perform the global registration by multiplying the sample brain image with a transformation matrix to obtain a transformed sample brain image. Further, the processing device 120b may further register the transformed sample brain image to the reference brain image by performing a local registration. For example, the processing device 120b may perform the local registration according to a deformation field to obtain a registered sample brain image. According to the global registration, the sample brain image may be roughly aligned with the reference brain image, for example, a brain parenchyma center of the transformed sample brain image may be substantially aligned with a brain parenchyma center of the reference brain image. According to the local registration, the sample brain image may be more finely aligned with the reference brain image, for example, a center of each tissue in the registered sample brain image may be substantially aligned with a center of a corresponding tissue in the reference sample brain image.

In 1030, the processing device 120b (e.g., the determination module 480) may determine the template image based on the plurality of registered sample images.

In some embodiments, the processing device 120a may determine the template image by performing an average operation on the plurality of registered sample images. For example, for a specific pixel in the template image, the processing device 120b may determine a corresponding pixel in each of the plurality of registered sample images and determine a value of the specific pixel in the template image based on an average value of a plurality of corresponding pixels in the plurality of registered sample images.

In 1040, for each of the plurality of sample images, the processing device 120b (e.g., the registration module 470) may determine a registered sample mask based on an initial sample mask corresponding to the sample image and the at least one transformation.

In some embodiments, for each of the plurality of sample images, the processing device 120b may determine the registered sample mask by transforming the initial sample mask according to the at least one transformation. Accordingly, the registered sample mask may reflect registered sample segmentations corresponding to the initial sample segmentations respectively. Each pixel in the registered sample mask may correspond to a pixel in the registered sample image. As described above, the registered sample segmentations also correspond to the plurality of labels included in the label sequence respectively. That is, for a specific registered sample segmentations (e.g., a registered sample segmentation labeled by "1"), pixels in the specific registered sample segmentation correspond to a same label (e.g., "1").

In 1050, for each pixel in the template image, the processing device 120b (e.g., the determination module 480) may determine probabilities of the pixel belonging to the registered sample segmentations.

As described above, take a specific pixel in the template image as an example, there is a corresponding pixel (we can call it as "target pixel" for convenience) in each of the plurality of registered sample images (or the plurality of registered sample masks corresponding to the plurality of registered sample images respectively). For the specific pixel, the target pixels may be located in different registered sample segmentations with different labels in different register sample masks. For example, it is assumed that there are 4 registered sample masks each of which includes 3 registered sample segmentations; for a registered sample mask A, the target pixel may be located in a registered sample segmentation labeled by 1; for a registered sample mask B, the target pixel may be located in a registered sample segmentation labeled by 1; for a registered sample mask C, the target pixel may be located in a registered sample segmentation labeled by 2; and for a registered sample mask D, the target pixel may be located in a registered sample segmentation labeled by 3. Then the processing device 120b may determine a probability of the specific pixel (or can be considered as the "target pixels") belonging to each registered sample segmentation. For example, the probability of the specific pixel belonging to the registered sample segmentation labeled by 1 is 2/4, the probability of the specific pixel belonging to the registered sample segmentation labeled by 2 is 1/4, and the probability of the specific pixel belonging to the registered sample segmentation labeled by 3 is 1/4.

In 1060, the processing device 120*b* (e.g., the determination module 480) may determine the initial probability graph and the initial mask corresponding to the template image based on the probabilities corresponding to pixels in the template image.

In some embodiments, for each pixel in the template image, the processing device 120*b* may determine a maximum probability corresponding to the pixel from the probabilities of the pixel belonging to the registered sample segmentations and a registered sample segmentation (can be referred to as a "target registered sample segmentation") corresponding to the maximum probability. For example, also take the specific pixel above as an example, the maximum probability corresponding to the specific pixel is 2/4 and the target registered sample segmentation corresponding to the maximum probability is the registered sample segmentation labeled by 1. Further, the processing device 120*b* may determine the initial probability graph corresponding to the template image based on the maximum probabilities corresponding to the pixels in the template image. The processing device 120*b* may also determine the initial mask (which reflects initial segmentations) corresponding to the template image based on the target registered sample segmentations corresponding to the pixels in the template image.

In some embodiments, the processing device 120*b* may determine the initial probability graph corresponding to the template image directly based on the probabilities corresponding to pixels in the template image. In this situation, the initial probability graph can be understood as a multiple-dimensional graph that reflects probabilities of the pixels belonging to different registered sample segmentations. Further, the processing device 120*b* may determine the initial mask corresponding to the template image based on the probabilities (or the initial probability graph) corresponding to pixels in the template image and a preset probability threshold.

Take a specific registered sample segmentation (we can directly call it as a corresponding label for convenience) labeled "by a specific label (e.g., "1") as an example, for each pixel in the template image, the processing device 120*b* may determine whether the probability of the pixel belonging to the "specific label" is greater than the probability threshold. In response to determining that the probability of the pixel belonging to the "specific label" is greater than the probability threshold, the processing device 120*a* may determine that the pixel belongs to the "specific label." The processing device 120*b* may process all the pixels in the template image in a similar manner and accordingly determine the final initial mask corresponding to the template image.

It should be noted that the above description regarding the process 1000 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 1000. For example, a storing operation may be added elsewhere in the process 1000. In the storing operation, the processing device 120*a* may store information and/or data generated and/or used in the process 1000 in a storage device (e.g., the storage device 150) disclosed elsewhere in the present disclosure. In some embodiments, two or more operations in the process 1000 may be executed in a single operation. For example, operations 1020 and 1040 may be combined as a single operation in which the processing device 120*b* may both register the sample images and transform the initial sample masks.

FIG. 11 is a schematic diagram illustrating an exemplary process for determining a template image according to some embodiments of the present disclosure. As shown in FIG. 11, a plurality of sample images 1110 are CT brain images of normal and healthy persons and a reference image 1120 is an MRI brain image. Initial sample segmentations of the plurality of sample images 1110 were manually determined by an operator. As described in operation 1020, a plurality of registered sample images 1130 were generated by registering the plurality of sample images 1110 to the reference image 1120 according to at least one transformation. The template image 1040 was generated by performing an average operation on the plurality of registered sample images 1130.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated.

Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for image segmentation, comprising:
a storage device storing a set of instructions;
at least one processor in communication with the storage device, wherein when executing the set of instructions, the at least one processor is configured to direct the system to perform operations including:
obtaining a target image to be segmented;
obtaining a template image relating to the target image, the template image corresponding to an initial mask that reflects initial segmentations of the template image;
determining a first transformation and an intermediate template image by preliminarily registering the template image to the target image;
generating an intermediate mask based on the initial mask and the first transformation;
determining, based on the intermediate mask, one or more first regions from the target image and one or more second regions from the intermediate template image, the one or more second regions corresponding to the one or more first regions respectively;
determining a second transformation by registering each of the one or more second regions to the corresponding first region; and
determining a target mask according to which the target image can be segmented based on one or more second transformations corresponding to the one or more second regions respectively and the intermediate mask.

2. The system of claim 1, wherein a similarity value between each of the one or more first regions and its corresponding second region is less than a similarity threshold.

3. The system of claim 1, wherein the one or more second transformations include one or more second deformation fields, and the determining a target mask according to which the target image can be segmented based on one or more second transformations corresponding to the one or more second regions respectively and the intermediate mask includes:

determining an initial deformation field corresponding to the intermediate template image, the initial deformation field being a displacement field with zero displacement;

determining a target transformation based on the initial deformation field and the one or more second deformation fields; and determining the target mask based on the target transformation and the intermediate mask.

4. The system of claim 3, wherein the determining a target transformation based on the initial deformation field and the one or more second deformation fields includes:

determining an intermediate deformation field by combining the initial deformation field and the one or more second deformation fields; and determining the target transformation by smoothing the intermediate deformation field.

5. The system of claim 3, wherein the determining the target mask based on the target transformation and the intermediate mask includes:

determining a registered template image based on the target transformation and the intermediate template image;

determining a first similarity value between a left part of the target image and a left part of the registered template image;

determining a second similarity value between a right part of the target image and a right part of the registered template image;

determining whether the first similarity value and the second similarity value satisfy a preset condition;

in response to determining that the first similarity value and the second similarity value satisfy the preset condition, determining a turned template image by performing a turning operation on a part of the registered template image, the part corresponding to one of the left part and the right part that corresponds to a greater similarity value;

determining a third transformation by registering the turned template image to the target image; and determining the target mask based on the target transformation, the third transformation, and the intermediate mask.

6. The system of claim 1, wherein the target image relates to a brain, and the operations further include:

determining, based on the target mask, target segmentations of the target image; and determining, based on the target segmentations of the target image, an evaluation score of the brain, the evaluation score reflecting an ischemic condition of the brain.

7. The system of claim 6, wherein the template image corresponds to an initial probability graph, wherein for each pixel in the template image, the initial probability graph reflects a probability of the pixel belonging to its corresponding initial segmentation.

8. The system of claim 7, wherein the determining, based on the target segmentations of the target image, an evaluation score of the brain includes:

determining a target probability graph based on the initial probability graph, the first transformation, and the one or more second transformations; and determining the evaluation score of the brain based on the target segmentations of the target image and the target probability graph.

9. The system of claim 1, wherein the obtaining a template image relating to the target image includes:

obtaining a plurality of sample images each of which corresponds to an initial sample mask that reflects initial sample segmentations of the sample image;

for each of the plurality of sample images, determining a registered sample image by registering the sample image to a reference image according to at least one transformation; and determining the template image based on the plurality of registered sample images.

10. The system of claim 9, wherein the initial sample mask is manually determined by an operator.

11. The system of claim 9, wherein the at least one transformation includes a transformation using a transformation matrix and a transformation using a deformation field.

12. The system of claim 9, wherein the determining the template image based on the plurality of registered sample images includes:

determining the template image by performing an averaging operation on the plurality of registered sample images.

13. The system of claim 9, wherein the operations further include:

for each of the plurality of sample images, determining a registered sample mask based on the initial sample mask corresponding to the sample image and the at least one transformation, the registered sample mask reflecting registered sample segmentations corresponding to the initial sample segmentations;

for each pixel in the template image, determining probabilities of the pixel belonging to the registered sample segmentations; and determining an initial probability graph and the initial mask corresponding to the template image based on the probabilities corresponding to the pixels in the template image.

14. A method for image segmentation, comprising:

obtaining a target image to be segmented;

obtaining a template image relating to the target image, the template image corresponding to an initial mask that reflects initial segmentations of the template image;

determining a first transformation and an intermediate template image by preliminarily registering the template image to the target image;

generating an intermediate mask based on the initial mask and the first transformation;

determining, based on the intermediate mask, one or more first regions from the target image and one or more second regions from the intermediate template image, the one or more second regions corresponding to the one or more first regions respectively;

determining a second transformation by registering each of the one or more second regions to the corresponding first region; and determining a target mask according to which the target image can be segmented based on one or more second transformations corresponding to the one or more second regions respectively and the intermediate mask.

15. The method of claim 14, wherein a similarity value between each of the one or more first regions and its corresponding second region is less than a similarity threshold.

16. The method of claim 14, wherein the one or more second transformations include one or more second deformation fields, and the determining a target mask according to which the target image can be segmented based on one or more second transformations corresponding to the one or more second regions respectively and the intermediate mask includes:

determining an initial deformation field corresponding to the intermediate template image, the initial deformation field being a displacement field with zero displacement;

determining a target transformation based on the initial deformation field and the one or more second deformation fields; and determining the target mask based on the target transformation and the intermediate mask.

17. The method of claim 16, wherein the determining a target transformation based on the initial deformation field and the one or more second deformation fields includes:

determining an intermediate deformation field by combining the initial deformation field and the one or more second deformation fields; and determining the target transformation by smoothing the intermediate deformation field.

18. The method of claim 16, wherein the determining the target mask based on the target transformation and the intermediate mask includes:

determining a registered template image based on the target transformation and the intermediate template image;

determining a first similarity value between a left part of the target image and a left part of the registered template image;

determining a second similarity value between a right part of the target image and a right part of the registered template image;

determining whether the first similarity value and the second similarity value satisfy a preset condition;

in response to determining that the first similarity value and the second similarity value satisfy the preset condition, determining a turned template image by performing a turning operation on a part of the registered template image, the part corresponding to one of the left part and the right part that corresponds to a greater similarity value;

determining a third transformation by registering the turned template image to the target image; and determining the target mask based on the target transformation, the third transformation, and the intermediate mask.

19. A system, comprising:

a storage device storing a set of instructions;

at least one processor in communication with the storage device, wherein when executing the set of instructions, the at least one processor is configured to direct the system to perform operations including:

obtaining a plurality of sample images each of which corresponds to an initial sample mask that reflects sample segmentations of the sample image;

for each of the plurality of sample images, determining a registered sample image by registering the sample image to a reference image according to at least one transformation; and determining a template image based on the plurality of registered sample images, including:

determining the template image by performing an averaging operation on the plurality of registered sample images;

for each of the plurality of sample images, determining a registered sample mask based on the initial sample mask corresponding to the sample image and the at least one transformation, the registered sample mask reflecting registered sample segmentations corresponding to the sample segmentations;

for each pixel in the template image, determining probabilities of the pixel belonging to the registered sample segmentations; and determining an initial probability graph and an initial mask corresponding to the template image based on the probabilities corresponding to the pixels in the template image, the initial mask reflecting initial segmentations of the template image.

* * * * *